(12) United States Patent
Hiratsuka et al.

(10) Patent No.: US 8,173,301 B2
(45) Date of Patent: May 8, 2012

(54) POSITIVE ELECTRODE ACTIVE MATERIAL FOR NON-AQUEOUS ELECTROLYTE SECONDARY BATTERY AND NON-AQUEOUS ELECTROLYTE SECONDARY BATTERY INCLUDING THE SAME

(75) Inventors: Hidekazu Hiratsuka, Osaka (JP); Norihiro Yamamoto, Osaka (JP); Yutaka Kawatate, Osaka (JP); Hiroaki Furuta, Osaka (JP); Kensuke Nakura, Osaka (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 428 days.

(21) Appl. No.: 12/265,231

(22) Filed: Nov. 5, 2008

(65) Prior Publication Data

US 2009/0117469 A1 May 7, 2009

Related U.S. Application Data

(60) Provisional application No. 60/985,748, filed on Nov. 6, 2007.

(51) Int. Cl.
*H01M 4/525* (2010.01)
*H01M 4/13* (2010.01)
*H01M 4/505* (2010.01)
*C01D 15/00* (2006.01)

(52) U.S. Cl. .............. 429/231.1; 429/223; 429/224; 429/231.3; 429/231.95; 423/594.3

(58) Field of Classification Search .............. 429/231.8, 429/231.95, 220, 223, 224, 231.1; 423/594.4, 423/179.5; 252/182.1
See application file for complete search history.

(56) References Cited

U.S. PATENT DOCUMENTS

| 5,718,989 | A | 2/1998 | Aoki et al. | |
| 6,045,771 | A * | 4/2000 | Matsubara et al. | 423/594.4 |
| 6,660,432 | B2 | 12/2003 | Paulsen et al. | |
| 6,929,883 | B2 | 8/2005 | Suhara et al. | |
| 6,964,828 | B2 | 11/2005 | Lu et al. | |
| 2004/0058243 | A1* | 3/2004 | Ohzuku et al. | 429/231.1 |
| 2004/0126660 | A1* | 7/2004 | Ohzuku et al. | 429/223 |
| 2005/0079416 | A1* | 4/2005 | Ohzuku et al. | 429/231.1 |
| 2006/0024584 | A1 | 2/2006 | Kim et al. | |
| 2006/0068293 | A1 | 3/2006 | Kim et al. | |
| 2007/0054191 | A1 | 3/2007 | Shirane et al. | |
| 2008/0118833 | A1 | 5/2008 | Ueda et al. | |

FOREIGN PATENT DOCUMENTS

| EP | 1 939 971 A1 | 7/2008 |
| JP | 10-199525 | 7/1998 |
| JP | 10-294100 | 11/1998 |
| JP | 2004-134236 | 4/2004 |
| JP | 2006-107818 | 4/2006 |
| JP | 2006-107845 | 4/2006 |
| JP | 2006-173099 | 6/2006 |
| JP | 2007-066834 | 3/2007 |
| JP | 2007-165297 | 6/2007 |
| WO | WO 01/92158 A1 | 12/2001 |
| WO | WO 2005/117198 A1 | 12/2005 |

OTHER PUBLICATIONS

Machine Translation of JP 2007-165297, Miyagi et al., Jun. 2007.*

(Continued)

*Primary Examiner* — Jonathan Crepeau
*Assistant Examiner* — Kenneth Douyette
(74) *Attorney, Agent, or Firm* — McDermott Will & Emery LLP

(57) ABSTRACT

A positive electrode active material for a non-aqueous electrolyte secondary battery including a lithium-containing transition metal oxide having a closest-packed cubic structure of oxygen, the lithium-containing transition metal oxide having a composition represented by the formula (1):

$$Li[Li_p(Ni_xMn_yCo_z)_{1-p}]O_2,$$

where x, y, and z represent element contents of nickel, manganese, and cobalt, respectively, and satisfies $0.2+y \leq x \leq 0.7$, $0.15 \leq y$, $0.05 \leq z$, $x+y+z=1$, and $0 \leq p \leq 0.1$.

17 Claims, 15 Drawing Sheets

OTHER PUBLICATIONS

Dunglison et al., "A dictionary of medical science", Henry C. Lea, 1874, p. 100.*
International Search Report issued in International Application No. PCT/JP2008/003195 dated Mar. 3, 2009.
Ohzuku et al "Layered Lithium Insertion Materials of $LiCO_{1/3}NI_{1/3}Mn_{1/3}O_2$ for Lithium-ion Batteries" Chemistry Letters 2001 pp. 642-643, The Chemical Society of Japan 2001.

* cited by examiner

FIG. 9  6/2/2

POSITIVE ELECTRODE ACTIVE MATERIAL FOR NON-AQUEOUS ELECTROLYTE SECONDARY BATTERY AND NON-AQUEOUS ELECTROLYTE SECONDARY BATTERY INCLUDING THE SAME

RELATED APPLICATIONS

In accordance with the provisions of 35 U.S.C. 120, Applicants hereby claims the priority of U.S. Provisional Application No. 60/985,748 filed on Nov. 6, 2007, the disclosures of which Applications are incorporated by reference herein.

FIELD OF THE INVENTION

The present invention relates to a positive electrode active material for a non-aqueous electrolyte secondary battery and a non-aqueous electrolyte secondary battery including the same, particularly to a positive electrode active material including a lithium-containing transition metal oxide containing Ni, Mn, and Co.

BACKGROUND OF THE INVENTION

Non-aqueous electrolyte secondary batteries, or lithium ion secondary batteries have been widely used as power sources for mobile equipment such as mobile phones and notebook personal computers. Non-aqueous electrolyte secondary batteries are now indispensable for today's ubiquitous network society, for which further improvement in capacity is eagerly desired. Non-aqueous electrolyte secondary batteries have been recently employed as power sources for power tools. In the future, such non-aqueous electrolyte secondary batteries are expected to be used for wider applications including power sources for hybrid automobiles and the like.

Until today since the mass production of lithium ion secondary batteries started in 1991, the battery energy density has been doubled from 280 Wh/L to 580 Wh/L. In those years, there has been no change in the basic design using $LiCoO_2$ for a positive electrode active material and graphite for a negative electrode. In contrast, the techniques for improving the battery structure and for increasing the capacity have been advanced and there is little or no room left for improvement. As such, the development of new materials with high capacity, high performance, and high level of safety is expected.

Under these circumstances, studies have been actively conducted on ternary-system lithium-containing composite oxides containing three elements of nickel, manganese, and cobalt as a promising material that will replace $LiCoO_2$. Typical techniques relating to ternary-system lithium-containing composite oxides are disclosed in the following documents.

[Patent Document 1] U.S. Pat. No. 6,660,432
[Patent Document 2] U.S. Pat. No. 6,964,828
[Patent Document 3] U.S. Pat. No. 5,718,989
[Non-Patent Document 1] T. Ohzuku and Y. Makimura, Chem. Lett., 642 (2001)

BRIEF SUMMARY OF THE INVENTION

An object of the present invention is to provide a high capacity non-aqueous electrolyte secondary battery having a high level of safety and being excellent in load characteristics and cycle life.

The present invention has been achieved through precise studies on the composition of lithium-containing composite oxides containing three elements of nickel, manganese, and cobalt. Based on the triangular phase diagrams of these three elements, the trade-off relationship between high capacity and thermal stability was studied. As a result, a new specific point was found. A well-balanced material corresponding to this specific point is extremely important industrially, which leads to a great improvement in safety of materials containing nickel, manganese, and cobalt. Therefore, a high capacity non-aqueous electrolyte secondary battery excellent in load characteristics and cycle life can be provided.

The present invention relates to a positive electrode active material for a non-aqueous electrolyte secondary battery including a lithium-containing transition metal oxide having a closest-packed cubic structure of oxygen, wherein the lithium-containing transition metal oxide has a composition represented by the formula (1):

$Li[Li_p(Ni_xMn_yCo_z)_{1-p}]O_2$, where x, y, and z represent element contents of nickel, manganese, and cobalt, respectively, and satisfies $0.2+y \leqq x \leqq 0.7$, $0.15 \leqq y$, $0.05 \leqq z$, $x+y+z=1$ and $0 \leqq p \leqq 0.1$.

The inclusion of this positive electrode active material provides a battery having high charge and discharge capacities as well as a high level of safety. It is preferable that nickel, manganese, and cobalt are evenly dispersed at the atomic level in the lithium-containing transition metal oxide.

In one aspect of the invention, the lithium-containing transition metal oxide includes a domain where nickel and manganese are contained in a molar ratio of 1:1 or 2:1 and a domain where nickel and cobalt are contained in a molar ratio of 1:1.

In one aspect of the invention, it is preferable that in a triangular phase diagram showing the element contents of nickel, manganese, and cobalt in terms of molar ratio, the composition represented by the formula (1) falls within a pentagonal region defined by five vertices satisfying (x:y:z)= (6:2:2), (5:2.5:2.5), (5:3.3:1.7), (6.36:2.73:0.91), and (6.25: 2.5:1.25). It is more preferable that the composition represented by the formula (1) falls within a region satisfying $x/(x+y+z)=0.55$ to 0.65.

In performing charge and discharge using the positive electrode active material formed into a sheet, at a current density of 0.33 mA/cm² or less per unit area of the sheet (preferably 0.13 mA/cm² or more) and 8 mA/g or less per unit weight of the positive electrode active material (preferably 3.2 mA/g or more) and at a potential ranging from 4.3 V to 3.0 V versus lithium metal potential, the difference between a charge capacity at the first cycle and a discharge capacity at the third cycle (irreversible capacity) is preferably 20 mAh/g or less, and the reversible capacity at the third cycle is preferably 165 mAh/g or more.

In forming the positive electrode active material into a sheet for the measurement of the above-described irreversible capacity and the reversible capacity, it is desirable to use a positive electrode material mixture including 85 parts by weight of the positive electrode active material, 10 parts by weight of acetylene black, and 5 parts by weight of polytetrafluoroethylene and form it into a sheet having a thickness of 200 µm.

In one aspect of the invention, the lithium-containing transition metal oxide includes a secondary particle having an average particle size (D50) of 11 µm or less (preferably 5 µm or more). The secondary particle is a sintered body of primary particles having an average particle size (D50) of 2 µm or less (preferably 0.1 µm or more). In a more preferred aspect, the average particle size of the secondary particle is 2.5 to 30 times or 10 to 30 times as large as that of the primary particle.

The tap density of the lithium-containing transition metal oxide is preferably 2.0 g/cm$^3$ or more, and more preferably 2.2 g/cm$^3$ or more. In practice, it is difficult to obtain a tap density exceeding 4 g/cm$^3$.

The potential at which potential V of the positive electrode active material sharply drops in a final stage of discharge, namely, the potential that gives a maximum $d^3 Q/dV^3$ when capacity is denoted by Q is preferably higher than 3.45 V versus lithium metal, and more preferably higher than 3.5 V.

In performing a differential scanning calorimetry (DSC) of the positive electrode active material at a temperature elevation rate of 10° C./min after charging of the positive electrode active material up to 4.4 V as a potential versus lithium metal, it is preferable that no substantial exothermic peak appears at temperatures of 200° C. or lower.

In one aspect of the invention, the interior or the surface of the primary particles of the lithium-containing transition metal oxide is doped with at least one different element selected from the group consisting of aluminum, magnesium, zirconia, manganese, and tin. Doping the interior or the surface of the primary particles with a different element inhibits leaching of metallic ions during continuous charge (during trickle charge).

The present invention further relates to a method for producing the above-described positive electrode active material for a non-aqueous electrolyte secondary battery including the steps of: preparing a precursor by a coprecipitation method performed by adding dropwise an aqueous alkaline solution into an aqueous acidic solution containing nickel ion, manganese ion, and cobalt ion; and mixing the precursor and lithium carbonate and baking the resultant mixture, thereby to prepare a particle of lithium-containing transition metal oxide with nickel, manganese, and cobalt evenly dispersed therein. It is preferable that the precursor is substantially spherical.

Here, the temperature in the baking is higher than 800° C., and preferably 900° C. or higher. For example, the temperature in the baking is 1100° C. or lower, and preferably 1000° C. or lower.

The present invention furthermore relates to a non-aqueous electrolyte secondary battery including a positive electrode including the above-described positive electrode active material, a negative electrode, and a non-aqueous electrolyte. It is preferable that the negative electrode includes a carbonaceous material capable of absorbing and desorbing lithium.

By using the positive electrode active material of the present invention, it is possible to provide a high capacity non-aqueous electrolyte secondary battery having a high level of safety and being excellent in load characteristics and cycle life.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
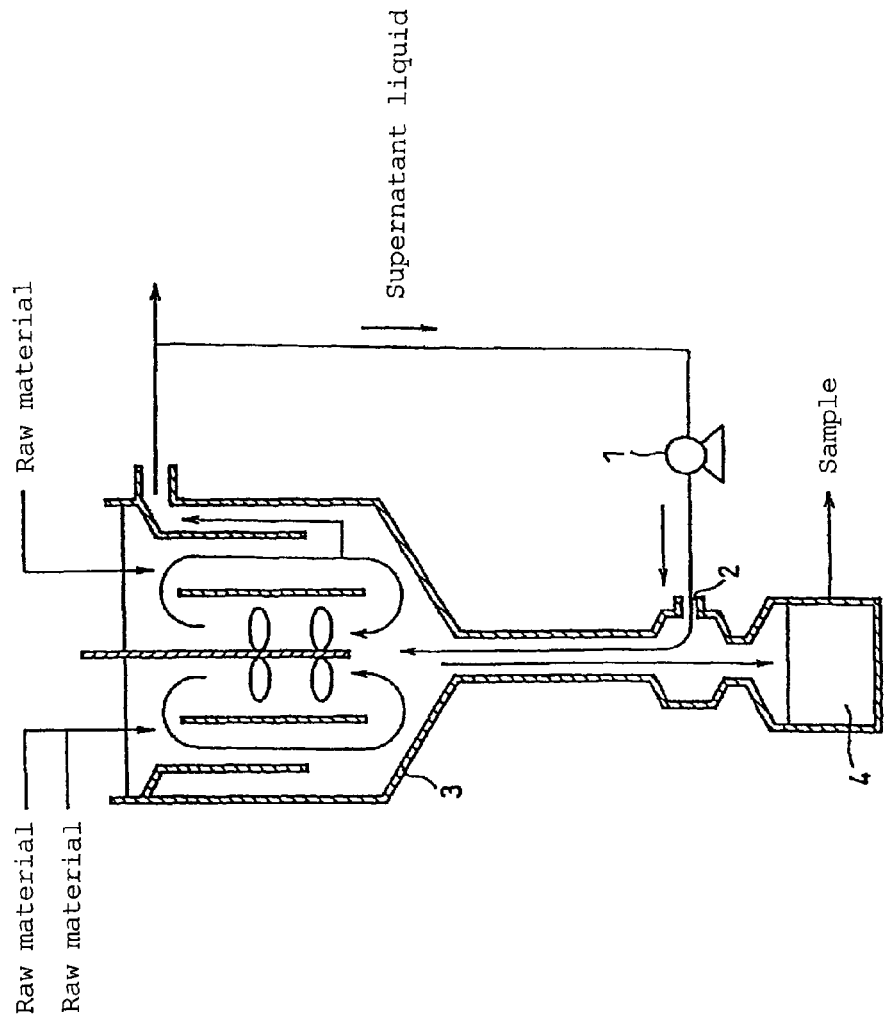
FIG. 1 shows a schematic illustration of an apparatus for synthesizing a precursor of positive electrode active material by a coprecipitation method.

The positive electrode active material of the present invention corresponds to a specific point or falls within a specific region in a triangular phase diagram of lithium-containing transition metal oxides containing three elements of nickel, manganese, and cobalt, and has extremely preferable properties as a positive electrode active material for a non-aqueous electrolyte secondary battery. The positive electrode active material of the present invention provides a highly effective solution to the problem of the trade-off relationship between high level of safety and high capacity, and thus is extremely useful industrially in batteries for household use for which well-balanced overall performance is required. In the following, an overview of the approach to the present invention is described with reference to data.

(1) Preparation Method of Positive Electrode Active Material

A production method of a positive electrode active material is described in detail below. The present invention uses a so-called coprecipitation method, which is performed by adding dropwise an aqueous alkaline solution into an aqueous acidic solution containing nickel ion, manganese ion, and cobalt ion. By using such a coprecipitation method, a substantially spherical precursor can be formed. By adding lithium carbonate to the precursor and baking the resultant mixture, a lithium-containing composite oxide with nickel, manganese, and cobalt evenly dispersed in its particle can be obtained.

As a raw material of the precursor, a mixed aqueous solution containing nickel sulfate, manganese sulfate, and cobalt sulfate each at a concentration of 1.2 mol/L can be used. Here, there is no particular limitation on the concentration of the mixed aqueous solution. Alternatively, an aqueous solution containing nickel ion, an aqueous solution containing manganese ion, and an aqueous solution containing cobalt ion may be introduced into a reaction tank while the feeding rate of each solution is adjusted so that a target composition ratio can be obtained. For example, an aqueous solution containing nickel ion, an aqueous solution containing manganese ion, and an aqueous solution containing cobalt ion are introduced into a reaction tank with an internal volume of 5 L at such a rate that the total feeding rate of these solutions is 1.5 mL/min. At this time, an aqueous alkaline solution for effecting neutralization is simultaneously introduced into the reaction tank.

As the aqueous alkaline solution for effecting neutralization, an aqueous 4.8 mol/L NaOH solution, an aqueous $NH_3$ solution, and the like may be used. Here, there is no particular limitation on the concentration of the aqueous alkaline solution. For example, the aqueous alkaline solution is introduced into the reaction tank at a feeding rate of 0.75 mL/min.

In preparing a precursor by a coprecipitation method, it is preferable that the nickel, manganese, and cobalt elements are present in the bivalent state in a formed $Me(OH)_2$, where Me is nickel, manganese or cobalt. $Ni(OH)_2$, $Co(OH)_2$, and $Mn(OH)_2$ have similar layer structures. Therefore, in a precursor containing nickel, manganese, and cobalt in the bivalent state, the three elements are dispersed evenly at the nano-level.

In preparing a precursor by a coprecipitation method, manganese is very susceptible to oxidation and is easily oxidized by a slight amount of dissolved oxygen present in the aqueous solution, to be a trivalent manganese ion. The trivalent manganese ion forms MnOOH. Since MnOOH has a different structure from those of $Ni(OH)_2$, $Co(OH)_2$, and $Mn(OH)_2$, it is unlikely that three kinds of elements are dispersed evenly. In order to avoid this, it is preferable to purge the dissolved oxygen by bubbling an inert gas, for example, nitrogen gas or argon gas, into the aqueous solution, or alternatively to add a reducing agent such as ascorbic acid into the aqueous solution beforehand.

When coprecipitation reaction is allowed to proceed rapidly, fine particles are formed and thus a precursor with low tap density is formed. The tap density of an active material synthesized by using such a precursor is low. On the other hand, by using an apparatus as shown in FIG. 1, an active material with high tap density can be synthesized. The apparatus as shown in FIG. 1 has been devised such that the crystal nuclei formed at the beginning of the coprecipitation are not collected. To be more precise, a mixed solution fed from a supply port 2 with a pump 1 is circulated in a reaction tank 3. The circulating mixed solution forms a flow moving upward from the bottom of the reaction tank 3 so as to collide with the crystal nuclei moving downward by coprecipitation. A unit 4 for collecting a product is provided in the lower part of the apparatus. As such, only the precursor whose specific gravity has been increased as a result of the growth of crystals to a certain extent can precipitate without being pushed back by the flow of the mixed solution and reach the collecting unit 4.

By the method as described above, a precursor (a hydroxide, an oxide, etc.) having a large particle size of about 10 μm and a tap density of 2 $g/cm^3$ or more can be easily obtained.

Next, the precursor thus obtained (the hydroxide, the oxide, etc.) and a lithium compound (lithium hydroxide, lithium carbonate, etc.) are mixed together, and baked, whereby a target positive electrode active material is obtained. The baking temperature and other conditions are described in separate sections. It is necessary that the positive electrode active material thus obtained has a layered structure and has a crystalline structure belonging to R3-m.

The tap density can be measured by the following method. First, 50 g of positive electrode active material or precursor thereof is placed in a graduated cylinder with a capacity of 300 $cm^3$. Subsequently, vertical tapping of the graduated cylinder is applied at a rate of one time per second for 30 minutes. In the tapping, the vertical stroke length is set at 2 cm. Thereafter, the apparent volume of the positive electrode active material in the graduated cylinder is measured. The value obtained at this time is referred to as a tap density.

(2) Baking Temperature and Lithium Raw Material

The baking temperature in synthesizing an active material has a significant influence on the performance of the active material. It is well known, for example, when the composite oxide has a large nickel element content, baking at a high temperature may cause disorder where the lithium ion is partially replaced with the nickel ion. When this occurs, the nickel ion will be present together with lithium ion in the site that would have otherwise been occupied by the lithium ion. This inhibits the transfer of the lithium ion during charging and discharging, reducing the capacity. On the other hand, in order to increase the tap density of the active material, baking at a high temperature to increase the crystallinity is preferred.

A conceivable solution to such a trade-off relationship is to use a raw material with which a product with high crystallinity can be easily obtained by baking at a low temperature, such as lithium hydroxide. However, the production cost in the case of using lithium hydroxide as a raw material will be increased several times as much as that in the case of using lithium carbonate as a raw material.

Figure 2:
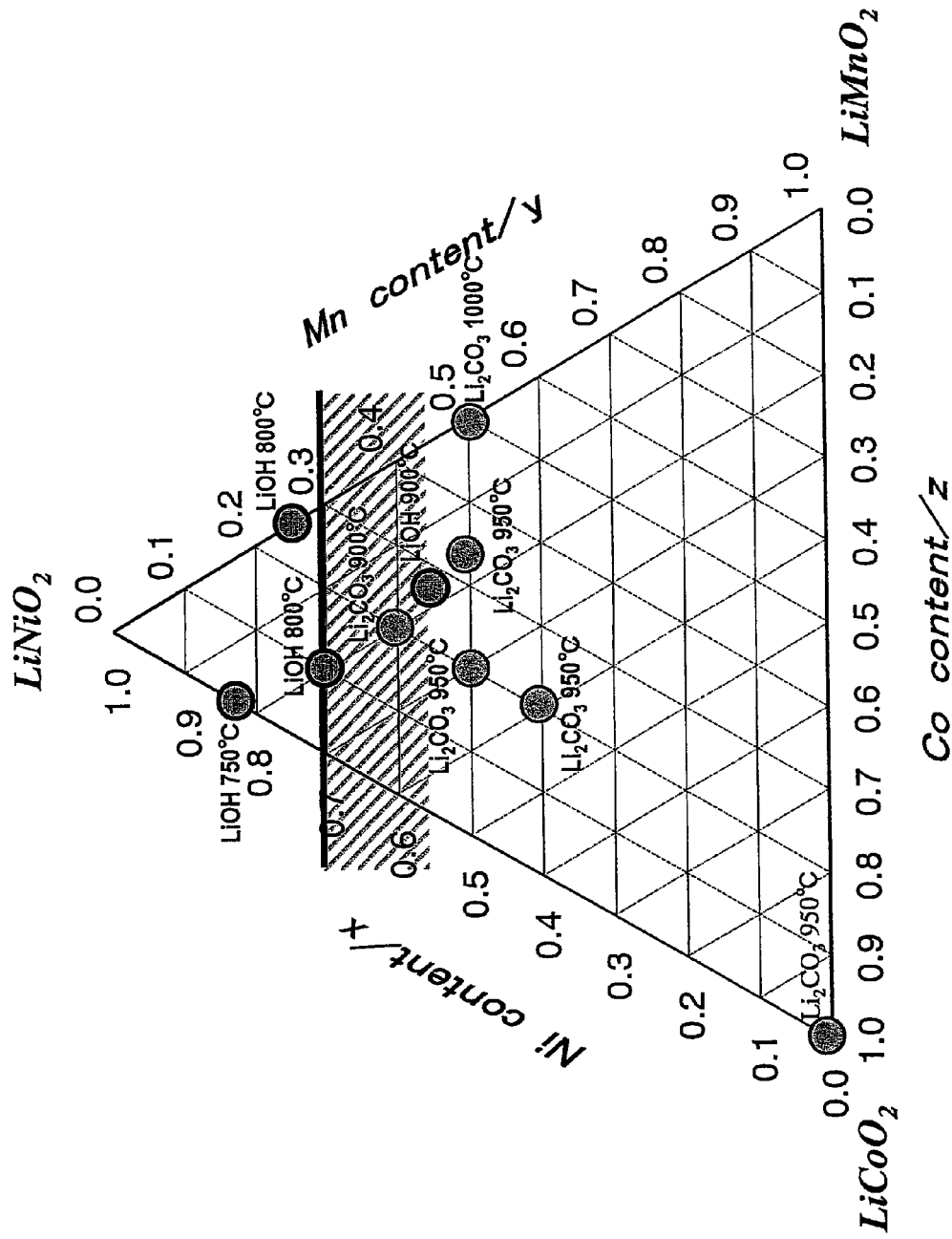
FIG. 2 shows a triangular phase diagram showing the relationship among a composition of positive electrode active material, a baking temperature, and a lithium raw material.

FIG. 2 shows the relationship among contents of nickel, manganese, and cobalt, a most preferred baking temperature, and a lithium raw material. In FIG. 2, the plot (○) represents the contents of nickel, manganese, and cobalt contained in the synthesized positive electrode active material. The lithium compound and the temperature in the vicinity of the plot show a lithium raw material and a baking temperature, respectively.

From FIG. 2, it is found that when the nickel content exceeds 0.7, synthesis is difficult unless lithium hydroxide is used as a lithium raw material. The higher the nickel content is, the more the above-described disorder proceeds unless the baking temperature is decreased, resulting in a significant reduction in capacity. However, if the baking temperature is decreased and inexpensive lithium carbonate is used as a lithium raw material, the reaction will not proceed sufficiently, failing to provide a single crystal phase. Since lithium hydroxide is melted at a relatively low temperature, lithium can easily enter the interior of the precursor. Oxidation reaction proceeds gradually from the outside to the interior of particles in association with increase in temperature. In the case of using lithium carbonate, decarbonation of the lithium carbonate must occur. For this reason, the temperature should be increased more higher than that in the case of using lithium hydroxide. Particularly when synthesizing large particles with high tap density, the lithium raw material has a great influence. As described above, when the nickel content is 0.7 or more, it is necessary to use high-cost lithium hydroxide. In view of the cost, therefore, a composition having a nickel content of less than 0.7 is preferred as shown in FIG. 2.

(3) Discharge Capacity Required for Target Battery

The positive electrode capacity required for designing a battery with high capacity is described below. For example, in the case where the target battery is a 18650-size cylindrical battery (18 mm in diameter and 65 mm in height) having a battery capacity of 2400 mAh, the capacity of the positive electrode active material should be 170 mAh/g or more in view of its absolute specific gravity (about 4.7 g/cm³).

Figure 3:
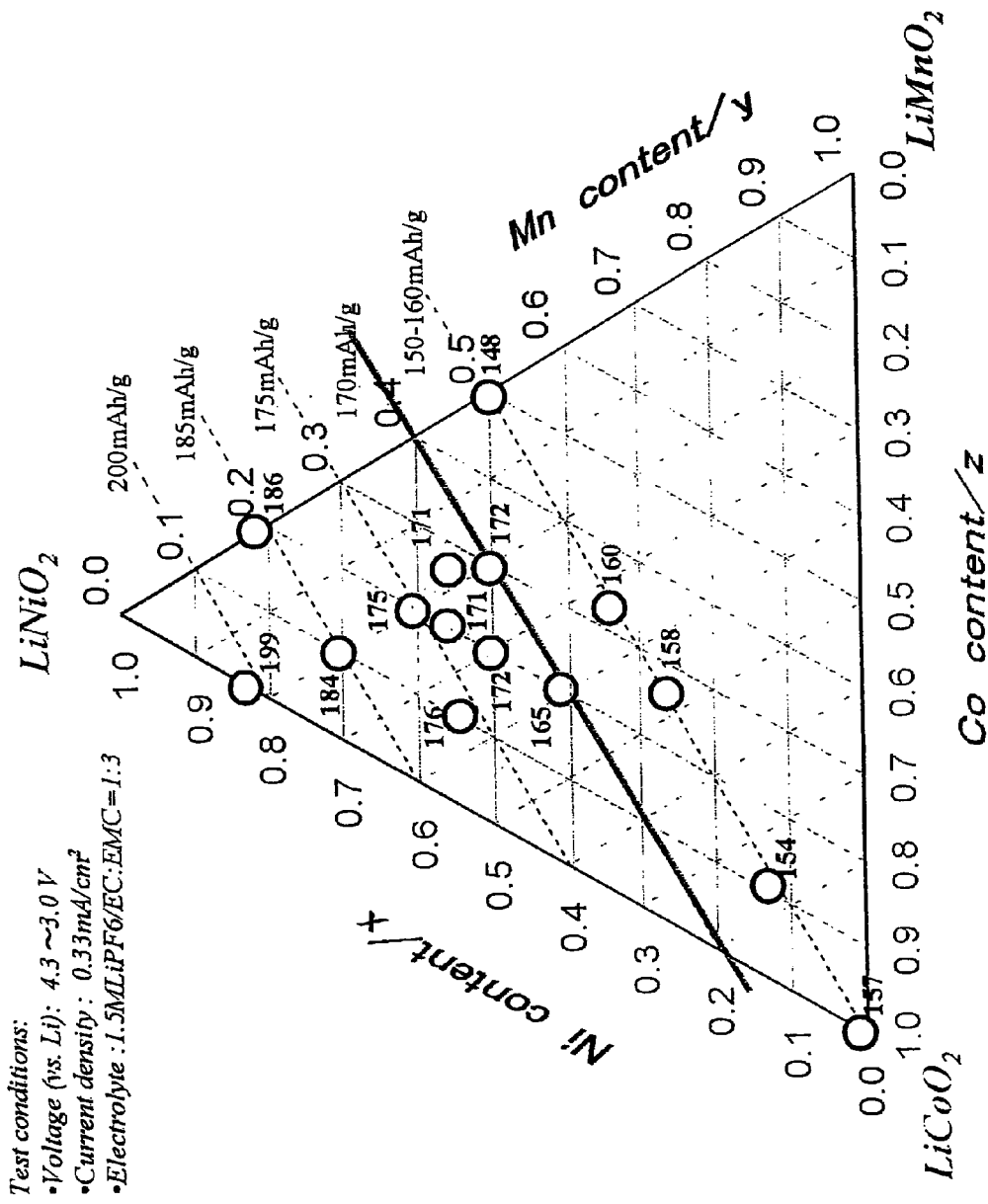
FIG. 3 shows a triangular phase diagram showing the relationship between a composition of positive electrode active material, and a discharge capacity.

FIG. 3 shows the relationship between contents of nickel, manganese, and cobalt, and a capacity of the positive electrode active material. In FIG. 3, the plot (○) represents the contents of nickel, manganese, and cobalt contained in the synthesized positive electrode active material. The numeric value in the vicinity of the plot shows a discharge capacity at the third cycle as a value per unit weight (mAh/g).

The capacities of the plots on each of the oblique lines in FIG. 3 are similar. These lines are almost in parallel to each other, indicating that the higher the nickel content is, the higher the capacity of the synthesized positive electrode active material is. From FIG. 3, it is found that a positive electrode active material having a Ni-rich composition shown above the 170 mAh/g line (upper side of FIG. 3) can achieve a target battery capacity. Therefore, in the case of an active material having a composition represented by the formula (1):

$$Li[Li_p(Ni_xMn_yCo_z)_{1-p}]O_2,$$

x and y need to satisfy $$x \geq 0.2 + y.$$

Here,

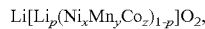

$$z = 1x - y.$$

(4) Methods of Producing and Evaluating Battery for Evaluation

The experiment for obtaining FIG. 3 was performed by the following method. The number of moles of lithium contained in the positive electrode active material was set to be 1.03 times as large as the total number of moles of transition metal elements, in other words, to be in excess (rich) by 3 mol %.

The positive electrode was formed of a positive electrode material mixture containing 85 wt % of positive electrode material, 10 wt % of acetylene black, and 5 wt % of PTFE (polytetrafluoroethylene) binder. Each powder was dry-mixed and kneaded, and then molded into a sheet by a roll press. The sheet was punched to yield a circular sheet of a predetermined size, which was used as the positive electrode. Prior to use, the positive electrode was dried under reduced pressure at 110° C. for 8 hours.

A 2016-size coin battery (20 mm in diameter and 1.6 mm in thickness) was produced with the used of the positive electrode thus obtained. A stainless-steel plate was used as a positive electrode current collector plate. A spring was interposed between the positive electrode current collector plate and a positive electrode case. After the positive electrode and a separator were assembled, a predetermined amount of electrolyte was injected into the positive electrode case. Thereafter, a negative electrode case with a lithium metal foil laminated on its inner surface serving as a negative electrode was engaged with the positive electrode case with a sealing plate interposed therebetween, to complete a coin battery. Here, the spring is used for the purpose of keeping the positive electrode, the separator, and the negative electrode in close contact with one another and of ensuring the accuracy of evaluation.

For the separator, a microporous polyethylene film was used. For the electrolyte, one prepared by dissolving $LiPF_6$ at a concentration of 1.5 mol/L in a solvent containing ethylene carbonate (EC) and ethyl methyl carbonate (EMC) in a volume ratio of 1:3 was used.

The battery components such as the positive electrode case, the negative electrode case, the sealing plate, the separator, and the lithium metal foil were used after dried overnight in dry air with a dew point of about −40° C. The battery was assembled in an atmosphere of dry air with a dew point of about −50° C.

A charge-discharge test was performed in a 25° C. environment at a constant current of 0.33 mA/cm² per unit area of the positive electrode and 8 mA/g per unit weight of the positive electrode active material. The end-of-discharge voltage was 3.0 V, and the end-of-charge voltage was 4.3 V.

(5) Irreversible Capacity of Positive Electrode Active Material

The charge-discharge efficiency in the initial charging and discharging of lithium-containing transition metal oxides is low, and irreversible capacity is observed. This irreversible capacity can be estimated from the difference between a charge capacity at the first cycle and a discharge capacity at the third cycle. Since the charge-discharge efficiency at the third and subsequent cycles is good, the capacity at the third and subsequent cycles is defined as reversible capacity.

Figure 4:
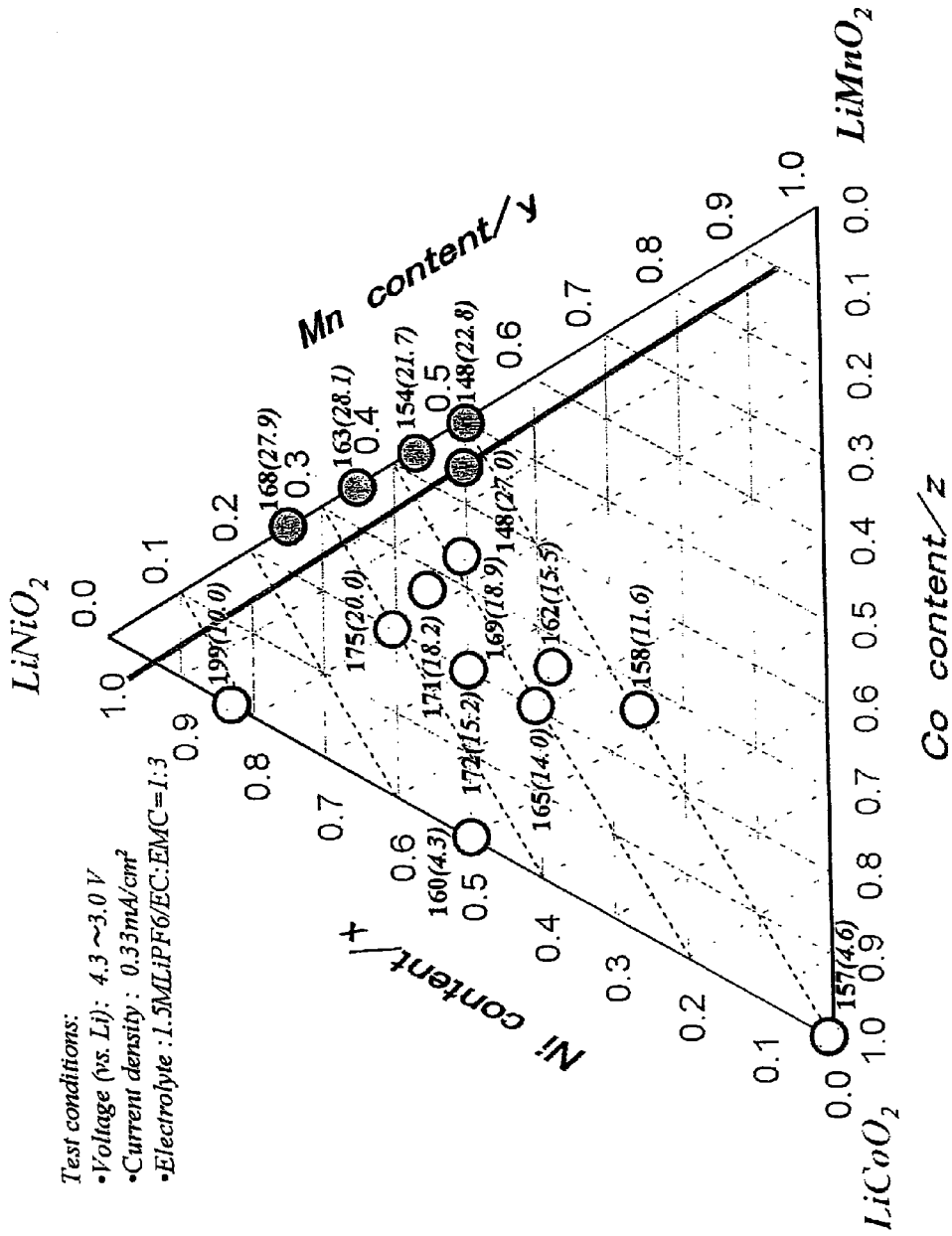
FIG. 4 shows a triangular phase diagram showing the relationship between a composition of positive electrode active material, and a reversible and irreversible capacities.

It is predicted that the irreversible capacity will differ depending on the contents of nickel, manganese, and cobalt. FIG. 4 shows the results of detailed study on the relationship between contents of nickel, manganese, and cobalt and an irreversible capacity. In FIG. 4, the plot (○) represents the contents of nickel, manganese, and cobalt contained in the positive electrode active material. The numeric value in the vicinity of the plot shows a reversible capacity (mAh/g) per unit weight of the positive electrode active material, and the numeric value in parenthesis following the reversible capacity shows an irreversibility capacity (mAh/g) per unit weight of the positive electrode active material.

From FIG. 4, it is found that the irreversible capacity is dependent predominantly on the content of cobalt. In particular, when the content of cobalt is 0.05 or less, the irreversible capacity shows a sharp increase. In order to produce a battery having a target capacity as mentioned in (3) above, the irreversible capacity is preferably 20 mAh/g or less in view of the battery design. Based on the foregoing, the content of cobalt should be larger than 0.05 and preferably 0.09 or more.

(6) Thermal Stability of Positive Electrode in Charged State

Figure 5:
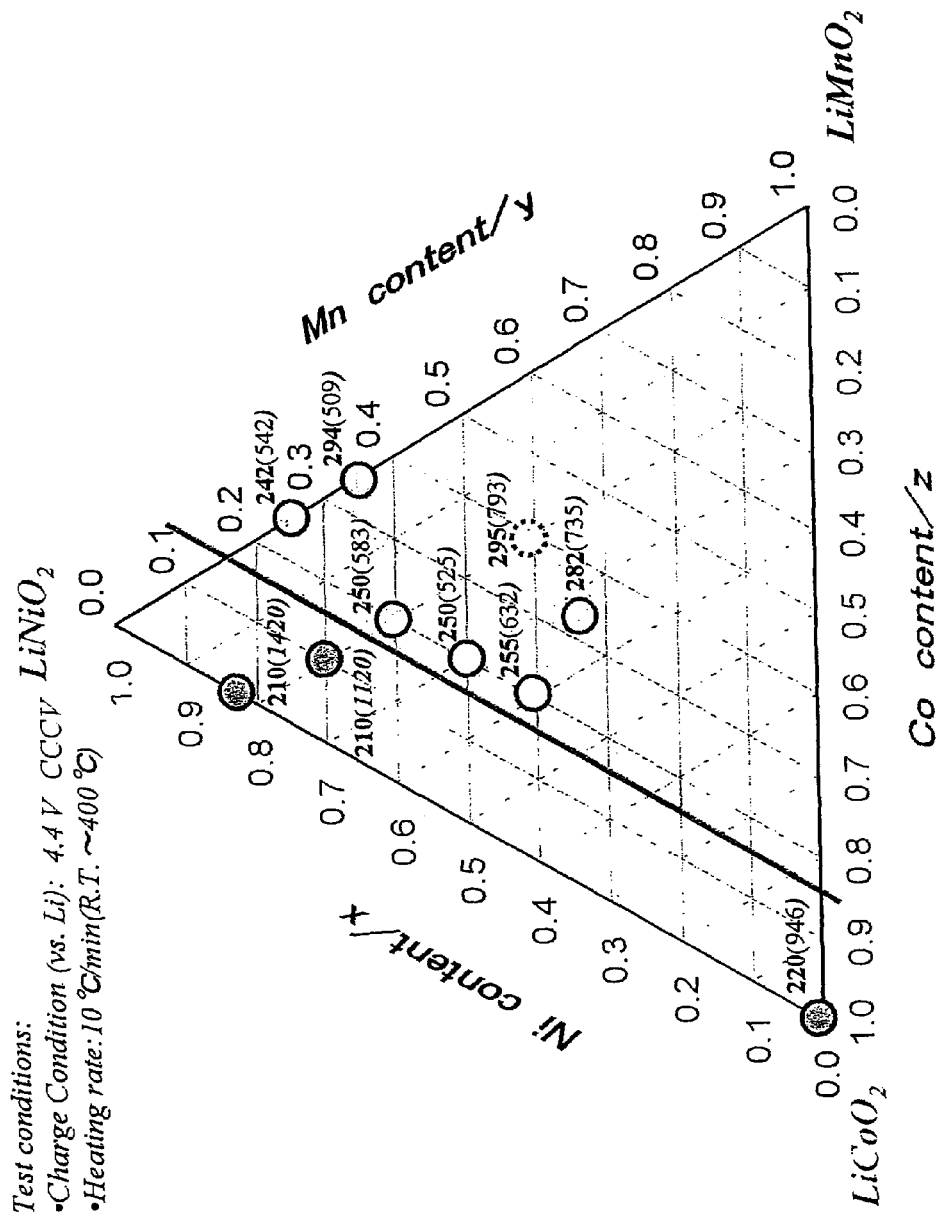
FIG. 5 shows a triangular phase diagram showing the relationship between a composition of positive electrode active material, and DSC characteristics.

Overheating the positive electrode in a charged state causes a thermal decomposition of active material (lithium-containing transition metal oxide) that accompanies release of oxygen. When this occurs, the oxygen chemically reacts with the conductive agent, the binder, the non-aqueous electrolyte, and others included in the positive electrode to generate heat. In view of the safety of batteries, it is preferable that this heat generation starts at a temperature as high as possible and the amount of heat generated by reaction is as small as possible. It is known that the foregoing exothermic reaction is greatly influenced by the contents of nickel, manganese, and cobalt in the active material, but this has not been studied in detail. FIG. 5 shows the relationship between a composition of the positive electrode active material and its thermal stability.

A coin battery as described in (4) above was produced and an experiment to obtain FIG. 5 was performed using this battery. The produced coin-battery was charged at a current value of 0.33 mA/cm² in a 25° C. environment until 4.4 V was reached and then charged at a constant voltage of 4.4 V until the current value reached 0.03 mA/cm². Thereafter, several mg of the positive electrode material mixture in a charge state was measured out and precisely weighed, to be subjected to DSC measurement (Differential Scanning Calorimetry). In the measurement, a characteristic heat generation was observed around 200° C. to 300° C. The temperature at which heat generation started and the amount of heat generated until a series of exothermic reactions were completed were measured.

In FIG. 5, the plot (○) represents the contents of nickel, manganese, and cobalt contained in the positive electrode active material. The numeric value in the vicinity of the plot shows a heat generation start temperature (° C.), and the numeric value in parenthesis following the heat generation start temperature shows an amount of heat generated per unit weight of the positive electrode material mixture (J/g).

From FIG. 5, it is revealed quantitatively that the thermal stability of the positive electrode is most depended on the content of manganese. From FIG. 5, when the content of manganese is less than 0.15, the heat generation start temperature in the DSC measurement is decreased to 250° C. or lower. Moreover, the amount of heat generated far exceeds 1000 J/g. As such, the safety is degraded as compared with that of $LiCoO_2$. Therefore, the content of manganese should be 0.15 or more.

(7) Specific Composition of Nickel, Manganese, and Cobalt

Figure 6:
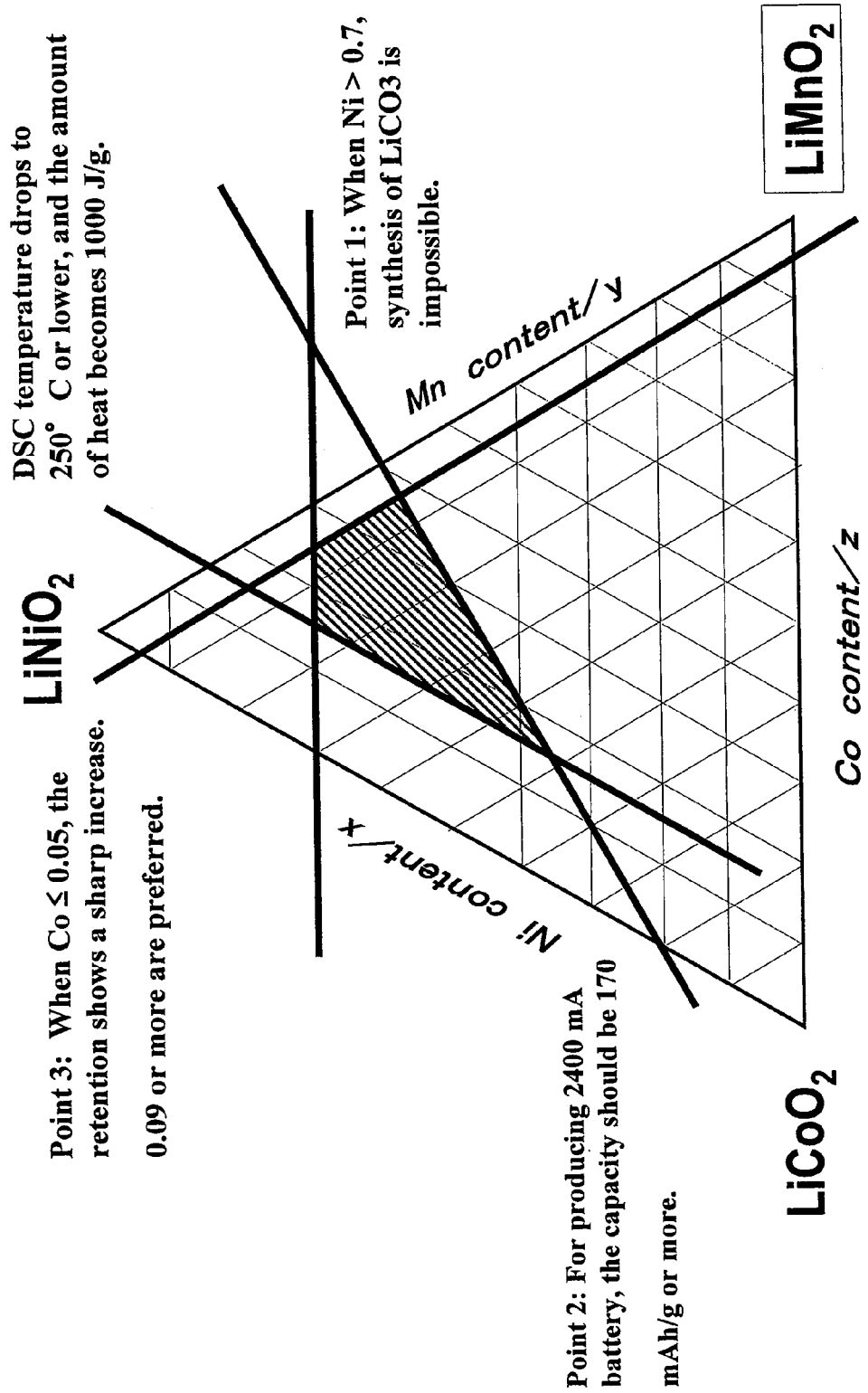
FIG. 6 shows a triangular phase diagram showing a region in which characteristics required for a positive electrode active material are well balanced.

FIG. 6 comprehensively shows a preferred range of compositions that satisfy the four conditions shown in FIGS. 2 to 5. The hatched region in FIG. 6 shows a region that satisfies all of the four conditions.

On the other hand, with regard to the ratios among nickel, manganese, and cobalt in a lithium-containing transition metal oxide having a crystal structure belonging to a layered structure (R3-m), the facts shown in Table 1 are known. The material of the present invention has a structure belonging to the same layered structure as above.

TABLE 1

| | |
|---|---|
| Ni:Mn = 1:1 | When Ni and Mn are approximately equal, Ni and Mn are present as $Ni^{2+}$ and $Mn^{4+}$ having different valences. Mn is not involved in redox and remains stable in the crystal without being leached out. |
| Ni:Co = 1:1 | When Ni:Co is 1:1, the lattice expansions during charging and discharging are offset to be zero. Paper: A. Ueda and T. Ohzuku, J. Electrochem. Soc. 141, 2010 (1994) |
| Ni:Mn = 2:1 | A superlattice array is formed. This relieves the spin frustration of Ni, which is regarded as a cause of the disorder of Ni in a triangular lattice point. |

The facts in Table 1 are described below in detail.

(A) The ratio between nickel and manganese is preferably 1:1. When the numbers of moles of nickel and manganese are approximately equal to each other, Ni and Mn are present as $Ni^{2+}$ and $Mn^{4+}$ having different valences, respectively. As a result, manganese is not involved in redox reaction and remains stable in the crystal without being leached out.

(B) The ratio between nickel and cobalt is preferably 1:1. When the ratio between nickel and cobalt is 1:1, the lattice expansion is unlikely to occur. This is presumably because the lattice of $LiCoO_2$ expands during charge, but conversely the lattice of $LiNiO_2$ contracts (See Paper: A. Ueda and T. Ohzuku, J. Electrochem. Soc. 141, 2010 (1994)).

(C) When the ratio between nickel and manganese is 2:1, a superlattice array is formed. This relieves the spin frustration of Ni. The spin frustration is regarded as a cause of the disorder of Ni as described above.

In view of the findings on the cases where nickel:manganese=1:1 or 2:1, and nickel:cobalt=1:1, it is predicted that the compositions (molar ratios) shown in Table 2 are specifically preferred. For example, the inclusion of a domain where nickel and manganese are contained in a ratio of 1:1 and a domain where nickel and cobalt are contained in a ratio of 1:1 provides a composition satisfying (A) and (B) above. Accordingly, the composition as a whole is such that nickel:manganese:cobalt=5:2.5:2.5 (the top row in Table 2).

TABLE 2

| | | Ni | Mn | Co | (Ni:Mn:Co) |
|---|---|---|---|---|---|
| No. 1 | | 1 | 1 | | |
| Example | | 1 | — | 1 | |
| | Total | 2 | 1 | 1 | 5:2.5:2.5 |
| No. 2 | | 2 | 2 | | |
| Example | | 1 | — | 1 | |
| | Total | 3 | 2 | 1 | 5:3.3:1.7 |
| No. 3 | | 2 | 1 | | |
| Example | | 1 | — | 1 | |
| | Total | 3 | 1 | 1 | 6:2:2 |
| No. 4 | | 4 | 2 | | |
| | | 1 | — | 1 | |
| | Total | 5 | 2 | 1 | 6.25:2.5:1.25 |
| No. 5 | | 6 | 3 | | |
| | | 1 | — | 1 | |
| | Total | 7 | 3 | 1 | 6.36:2.73:0.91 |

Likewise, it is predicted that there are five compositions that are specifically preferred. To be more precise, the following compositions are preferred.

Nickel:Manganese:Cobalt=6:2:2
Nickel:Manganese:Cobalt=5:2.5:2.5
Nickel:Manganese:Cobalt=5:3.3:1.7
Nickel:Manganese:Cobalt=6.36:2.73:0.91
Nickel:Manganese:Cobalt=6.25:2.5:1.25

Figure 7:
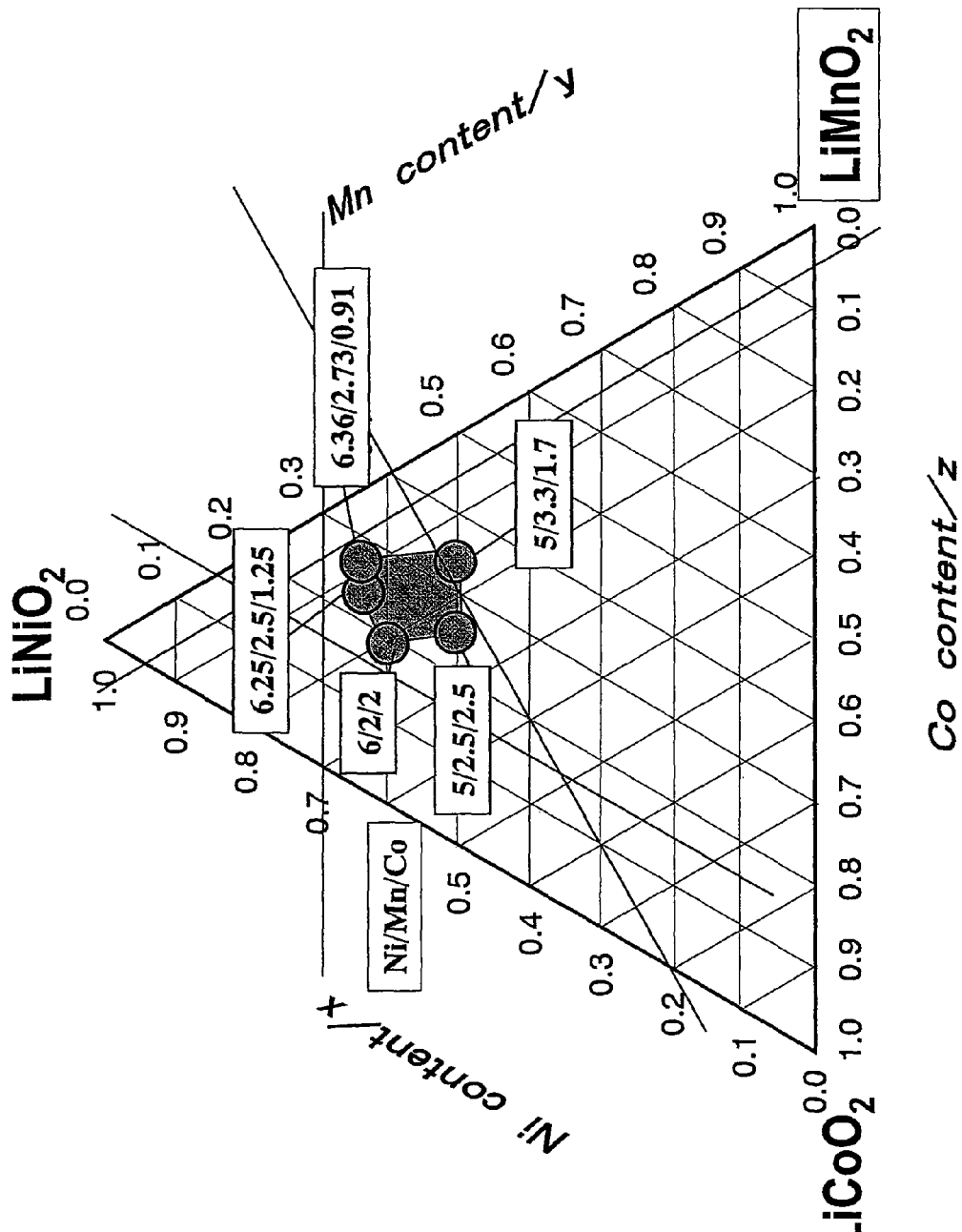
FIG. 7 shows a triangular phase diagram showing a region in which characteristics required for a positive electrode active material are particularly well balanced.

These five compositions are shown in FIG. 7 by dots (points). As is evident from FIG. 7, these five points all fall within the preferred region shown in FIG. 6. Therefore, it is considered that the foregoing five points represent the most preferred compositions and a pentagonal region defined by these five points as its vertices is a particularly preferred region in the hatched region shown in FIG. 6.

(8) Application of Positive Electrode Active Material to Non-Aqueous Electrolyte Secondary Battery The positive electrode active material of the present invention is applicable in various batteries including cylindrical batteries. The technology that has been used or optimized to date with respect to batteries including an active material such as $LiCoO_2$ can be similarly applied to the present invention. As the components of a battery other than the positive electrode active material, for example, the following materials can be used.

In general, the positive electrode includes a positive electrode current collector and a positive electrode material mixture carried thereon. The positive electrode material mixture may include a binder, a conductive agent, and the like in addition to the positive electrode active material. The positive electrode is produced by, for example, mixing the positive electrode material mixture including a positive electrode active material and optional components, and a liquid component, to prepare a positive electrode material mixture slurry, and applying the slurry thus prepared onto the positive electrode current collector, and drying.

Likewise, the negative electrode is produced by mixing a negative electrode material mixture including a negative electrode active material and optional components, and a liquid component, to prepare a negative electrode material mixture slurry, and applying the slurry thus prepared onto a negative electrode current collector, and drying. As the negative electrode active material, for example, a metal, a metallic fiber, a carbon material, an oxide, a nitride, a tin compound, a silicide, various alloy materials, and the like may be used. As the carbon material, for example, a carbon material, such as various natural graphites, coke, a carbon undergoing graphitization, a carbon fiber, a spherical carbon, various artificial graphites, an amorphous carbon, and the like is used. In addition, simple substance of silicon (Si) or tin (Sn), an alloy containing silicon or tin, a compound or a solid solution containing silicon or tin, and the like are preferred in view of their large capacity density. As the silicon compound, for example, $SiO_x$ where $0.05<x<1.95$ is preferred. These materials may be used by partially replacing Si with at least one element selected from the group consisting of B, Mg, Ni, Ti, Mo, Co, Ca, Cr, Cu, Fe, Mn, Nb, Ta, V, W, Zn, C, N and Sn to be formed into an alloy, a compound or a solid solution. As the tin compound, $Ni_2Sn_4$; $Mg_2Sn$; $SnO_x$, where $0<x<2$; $SnO_2$; $SnSiO_3$; and the like may be used. These negative electrode active materials may be used alone or in combination of two or more.

As the binder for a positive electrode or a negative electrode, it is possible to use, for example, polyvinylidene fluoride (PVDF), polytetrafluoroethylene, polyethylene, polypropylene, an aramid resin, a polyamide, a polyimide, a polyamide-imide, a polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyether sulfone, hexafluoropolypropylene, styrene-butadiene rubber, carboxymethylcellulose, and the like. Alternatively, a copolymer of two or more materials selected from the group consisting of tetrafluoroethylene, hexafluoropropylene, perfluoroalkyl vinylether, vinylidene fluoride, chlorotrifluoroethylene, ethylene, propylene, pentafluoropropylene, fluoromethyl vinyl ether, acrylic acid, and hexadiene may be used. Alternatively, two or more selected from these may be used in combination.

Examples of the conductive agent to be included in an electrode include graphites, such as natural graphite and artificial graphite; carbon blacks, such as acetylene black, Ketjen Black, channel black, furnace black, lamp black, and thermal black; conductive fibers, such as carbon fiber and metallic fiber; carbon fluoride; metallic powders, such as powder and aluminum powder; conductive whiskers such as zinc oxide and potassium titanate; conductive metal oxides, such as titanium oxide; and conductive organic materials, such as phenylene derivatives; and the like.

As for the blending ratio among the positive electrode active material, the conductive agent, and the binder, it is desirable that the positive electrode active material, the conductive agent, and the binder are blended in an amount of 79 to 97 wt %, 1 to 20 wt %, and 1 to 10 wt %, respectively. As for the blending ratios between the negative electrode active material and the binder, it is desirable that the negative electrode active material and the binder are blended in an amount of 93 to 99 wt % and 1 to 7 wt %, respectively.

As the current collector, a continuous length of porous conductive base plate or nonporous conductive base plate may be used. Examples of the positive electrode current collector include stainless steel, aluminum, titanium, and the like. Further, examples of the negative electrode current collector include stainless steel, nickel, copper, and the like. The thicknesses of these current collectors are not particularly limited but preferably 1 to 500 µm and more preferably 5 to 20 µm. When the thicknesses of the current collectors are within these preferably ranges, the electrode plates can be made light in weight while the strength thereof is maintained.

As a separator interposed between the positive electrode and the negative electrode, a microporous thin film, a woven fabric, a nonwoven fabric, and the like, having a high ion permeability and provided with a predetermined mechanical strength as well as an insulating property is used. As a material of the separator, in view of the safety of non-aqueous electrolyte secondary batteries, it is preferable to use, for example, a polyolefin such as polypropylene or polyethylene because of its excellent durability and shut-down function. The thickness of the separator is typically 10 to 300 µm, but desirably 40 µm or less. A range of 15 to 30 µm is more preferred, and a further preferred range of the thickness of the separator is from 10 to 25 µm. The microporous film may be a single-layered film made of one material, or alternatively a composite film or a multi-layered film made of one or two or more materials. It is preferable that the porosity of the separator is in a range of 30 to 70%. The porosity as used herein refers to a volume ratio of pores relative to the volume of the separator. A more preferred range of the porosity of the separator is 35 to 60%.

As the non-aqueous electrolyte, a material in the form of liquid, gel, or solid (polymer solid electrolyte) may be used. A liquid non-aqueous electrolyte (a non-aqueous electrolyte solution) is obtained by dissolving a solute (e.g., a lithium salt) in a non-aqueous solvent. The gelled non-aqueous electrolyte is a material including a non-aqueous electrolyte and a polymer material for retaining the non-aqueous electrolyte. As the polymer material, for example, polyvinylidene fluoride, polyacrylonitrile, polyethylene oxide, polyvinyl chloride, polyacrylate, vinylidene fluoride-hexafluoropropylene copolymer, and the like are suitably used.

As the non-aqueous solvent in which the solute is dissolved, it is possible to use a known non-aqueous solvent. Examples of the non-aqueous solvent include, without any particular limitation, cyclic carbonic acid esters, chain carbonic acid esters, cyclic carboxylic acid esters, and the like. Examples of the cyclic carbonic acid esters include propylene carbonate (PC), ethylene carbonate (EC), and the like. Examples of the chain carbonic acid esters include diethyl carbonate (DEC), ethyl methyl carbonate (EMC), dimethyl carbonate (DMC), and the like. Examples of the cyclic carboxylic acid esters include γ-butyrolactone (GBL), γ-valerolactone (GVL), and the like. These non-aqueous solvents may be used alone or in combination of two or more.

As the solute to be dissolved in the non-aqueous solvent, it is possible to use, for example, $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, chloroborane lithium, borates, imides, and the like. Examples of the borates include lithium bis(1,2-benzendioleate(2-)-O,O') borate, lithium bis(2,3-naphthalenedioleate (2-)-O,O') borate, lithium bis(2,2'-biphenyldioleate(2-)-O, O') borate, lithium bis(5-fluoro-2-oleate-1-benzenesulfonate-O,O') borate, and the like. Examples of the imides include lithium bis(trifluoromethanesulfonyl)imide (($CF_3SO_2)_2NLi$), lithium trifluoromethanesulfonyl nonafluorobutanesulfonyl imide ($LiN(CF_3SO_2)(C_4F_9SO_2)$), and lithium bis(pentafluoroethanesulfonyl)imide (($C_2F_5SO_2)_2$ NLi), and the like. These solutes may be used alone or in combination of two or more.

The non-aqueous electrolyte may include a material serving as an additive that will decompose on the negative electrode and form a coating film with high lithium ion conductivity and thus can improve the charge-discharge efficiency. The additive having such a function is exemplified by vinylene carbonate (VC), 4-methylvinylene carbonate, 4,5-dimethylvinylene carbonate, 4-ethylvinylene carbonate, 4,5- diethylvinylene carbonate, 4-propylvinylene carbonate, 4,5-dipropylvinylene carbonate, 4-phenylvinylene carbonate, 4,5-diphenylvinylene carbonate, vinyl ethylene carbonate (VEC), divinylethylene carbonate, and the like. These may be used alone or in combination of two or more. Among these, at least one selected from the group consisting of vinylene carbonate, vinyl ethylene carbonate, and divinylethylene carbonate is preferred. In the above compounds, hydrogen atoms may be partially replaced with fluorine atoms.

It is desirable that the dissolving amount of the solute in the non-aqueous solvent is within a range of 0.5 to 2 mol/L. In the non-aqueous electrolyte, a known benzene derivative that will decompose during overcharge and form a coating film on the electrode to inactivate the battery may be contained. A benzene derivative including a phenyl group and a cyclic compound group adjacent to the phenyl group is preferred. As the cyclic compound group, a phenyl group, a cyclic ether group, a cyclic ester group, a cycloalkyl group, a phenoxy group, and the like are preferred. Specific examples of the benzene derivative include cyclohexyl benzene, biphenyl, diphenyl ether, and the like. These may be used alone or in combination of two or more. However, the content of the benzene derivative is preferably 10 vol % or less relative to the total volume of the non-aqueous solvent.

The present invention is described below in detail based on the examples, but the present invention is not limited to the following examples.

Example 1

Positive electrode active materials having preferred compositions shown in Table 3 were synthesized. Samples of Nos. 1 to 3 have a composition corresponding to the above-described specific point. No. 4 is outside the region considered most preferable defined by the five points shown in FIG. 7, but has a composition falling within the hatched region shown in FIG. 6.

The positive electrode active material was synthesized by the method described in (1) above. First, a precursor with high tap density was synthesized by a coprecipitation method. In this process, the feeding rate of each aqueous sulfuric acid solution was adjusted so that a target composition of nickel, manganese, and cobalt could be obtained.

To the precursor thus obtained, lithium carbonate was added so that the ratio (molar ratio) of Li/Me (transition metal elements) could be 1.03. The resultant mixture was baked at 935° C. for 10 hours to give an active material having a target composition. Here, in the case where the Li/Me ratio was varied in a range of 0.99 to 1.07 in synthesizing a sample of each composition, the most favorable result was obtained when Li/Me=1.03. Further, in the case where the baking temperature was varied in a range of 900° C. to 1000° C. in synthesizing a sample of each composition, the most favorable result was obtained when 935° C.

The samples after baking were pulverized with a jet mill to give active material particles. The particle size of the active material particles is greatly influenced by the particle size of the precursor. The particle size of the precursor is controlled by the conditions of coprecipitation.

TABLE 3

| Sample No. | | 1 | 2 | 3 | 4 |
|---|---|---|---|---|---|
| Ni/Mn/Co Target composition | | 5/2.5/2.5 | 5/3.3/1.7 | 6/2/2 | 5/2/3 |

TABLE 3-continued

| Sample No. | | 1 | 2 | 3 | 4 |
|---|---|---|---|---|---|
| Baking temperature [° C.] | | 935 | 935 | 935 | 935 |
| Li ratio Li/Me | | 1.03 | 1.03 | 1.03 | 1.03 |
| Particle size | D10 [μm] | 1.79 | 3.49 | 5.6 | 2.55 |
|  | D50 [μm] | 7.10 | 7.59 | 10.2 | 8.20 |
|  | D90 [μm] | 12.99 | 12.98 | 16.5 | 13.92 |
| Tap Density [g/cm$^3$] | | 2.30 | 2.33 | 2.7 | 2.30 |
| Surface Area [m$^2$/g] | | 0.92 | 0.62 | 0.67 | 0.97 |
| PH [28.6 wt %, 25° C.] | | 11.75 | 11.90 | 11.93 | 11.94 |
| Me mol % | Ni | 49.8 | 50.6 | 60.1 | 49.9 |
|  | Mn | 25.1 | 29.9 | 20.7 | 20.4 |
|  | Co | 25.1 | 19.6 | 19.3 | 29.8 |
| XRD | a = [Å] | 2.864 | 2.867 | 2.868 | 2.863 |
|  | c = [Å] | 14.211 | 14.231 | 14.238 | 14.208 |

Table 3 shows the actually obtained values of powder physical properties and compositions of the samples. With regard to the crystal structure of the samples, the XRD measurement revealed that the samples had a single-phase layered structure. The a-axis length and the c-axis length were determined from a peak pattern assuming a hexagonal crystal structure by indexing peaks using Miller indices, which are also shown in Table 3.

Figure 8:
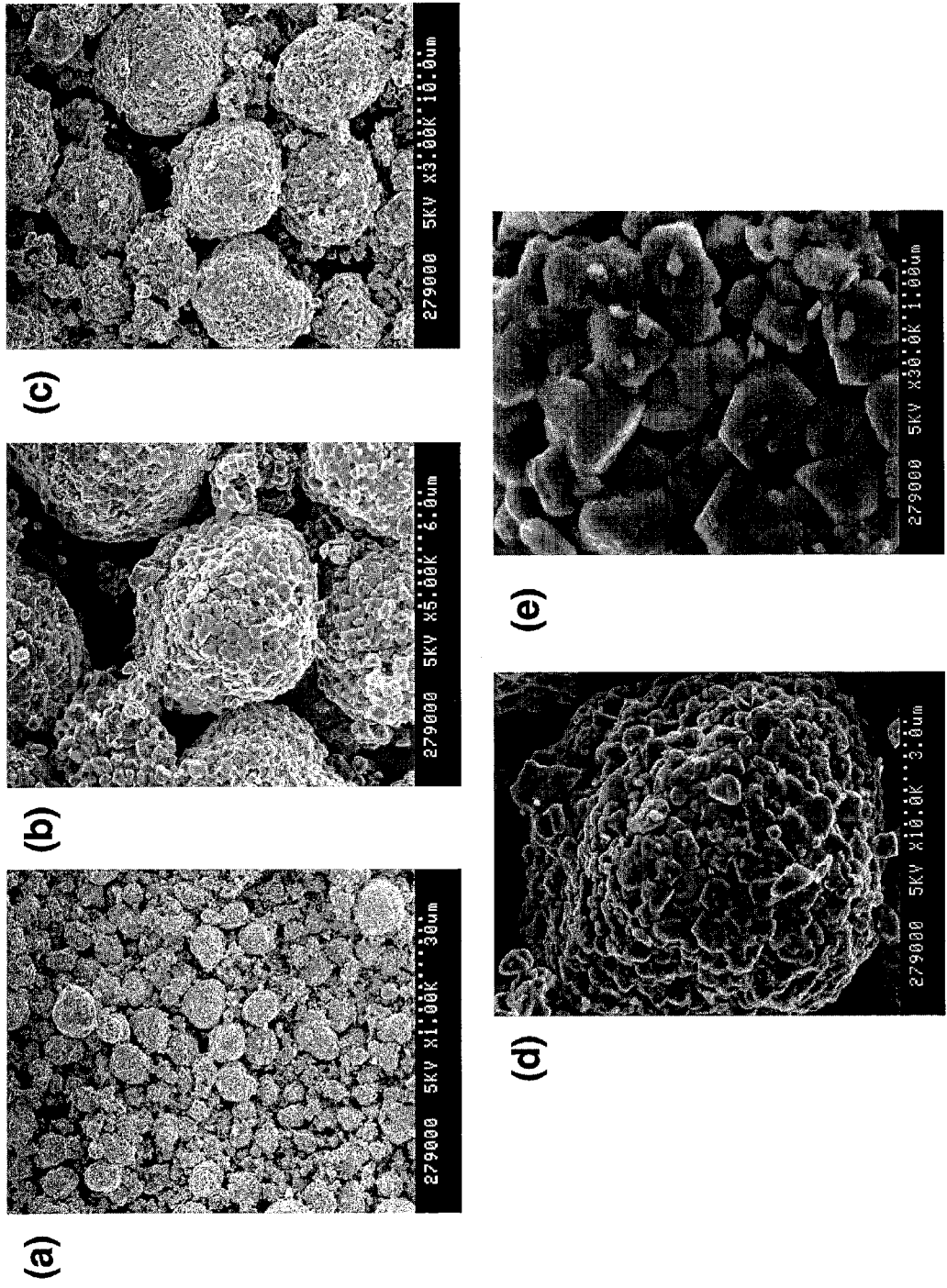
FIG. 8 shows SEM images of the particles of typical positive electrode active material particles.

Among the particle forms of the samples, no significant difference was observed. As an example, the results of electron microscopic (SEM) observation of Sample No. 3 of Ni:Mn:Co=6:2:2 are shown in FIG. 8. In FIG. 8, the magnification in (a) was ×1000, the magnification in (b) was ×5,000, the magnification in (c) was ×3,000, the magnification in (d) was ×10,000, and the magnification in (e) was ×30,000. From FIG. 8, it is found that the active material formed a spherical secondary particle, and the secondary particle was a sintered body of primary particles of about 0.5 μm to 1.0 μm in size.

The data regarding the particle size distribution of the secondary particle are also shown in Table 3. D10, D50, and D90 represent particle sizes when the accumulated volume is 10%, 50%, and 90%, respectively, and D50 corresponds to an average particle size.

Figure 9:
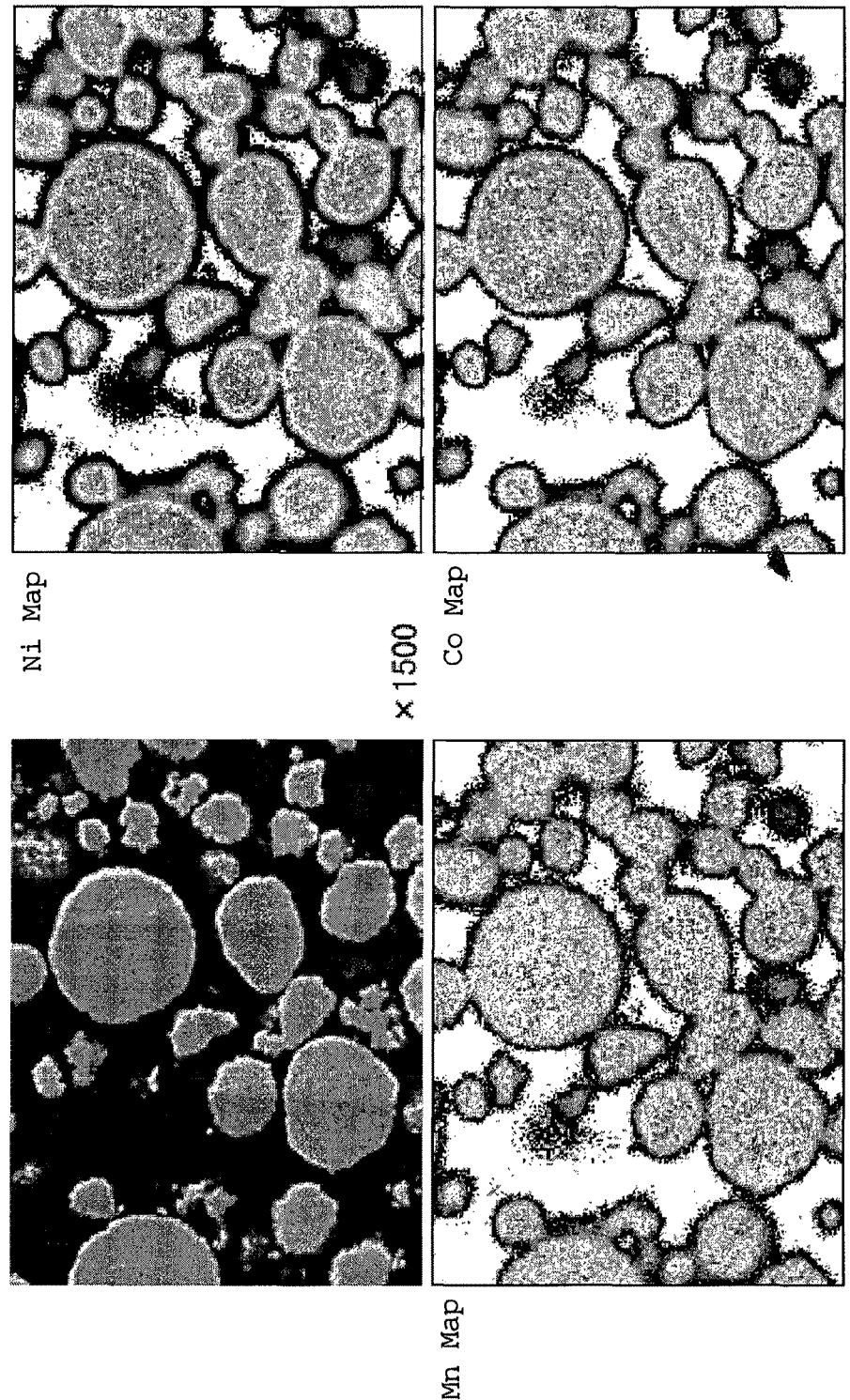
FIG. 9 shows element analysis maps of the cross section of the particles of the typical positive electrode active material particles.

FIG. 9 shows the results of mapping of the cross section of Sample No. 3 active material particles by energy dispersive X-ray fluorescence spectrometry (EDAX), namely, the element distribution in the interior of the particles. From FIG. 9, it is found that three elements of nickel, manganese, and cobalt were evenly dispersed at the nano level without being dispersed unevenly.

Figure 10:
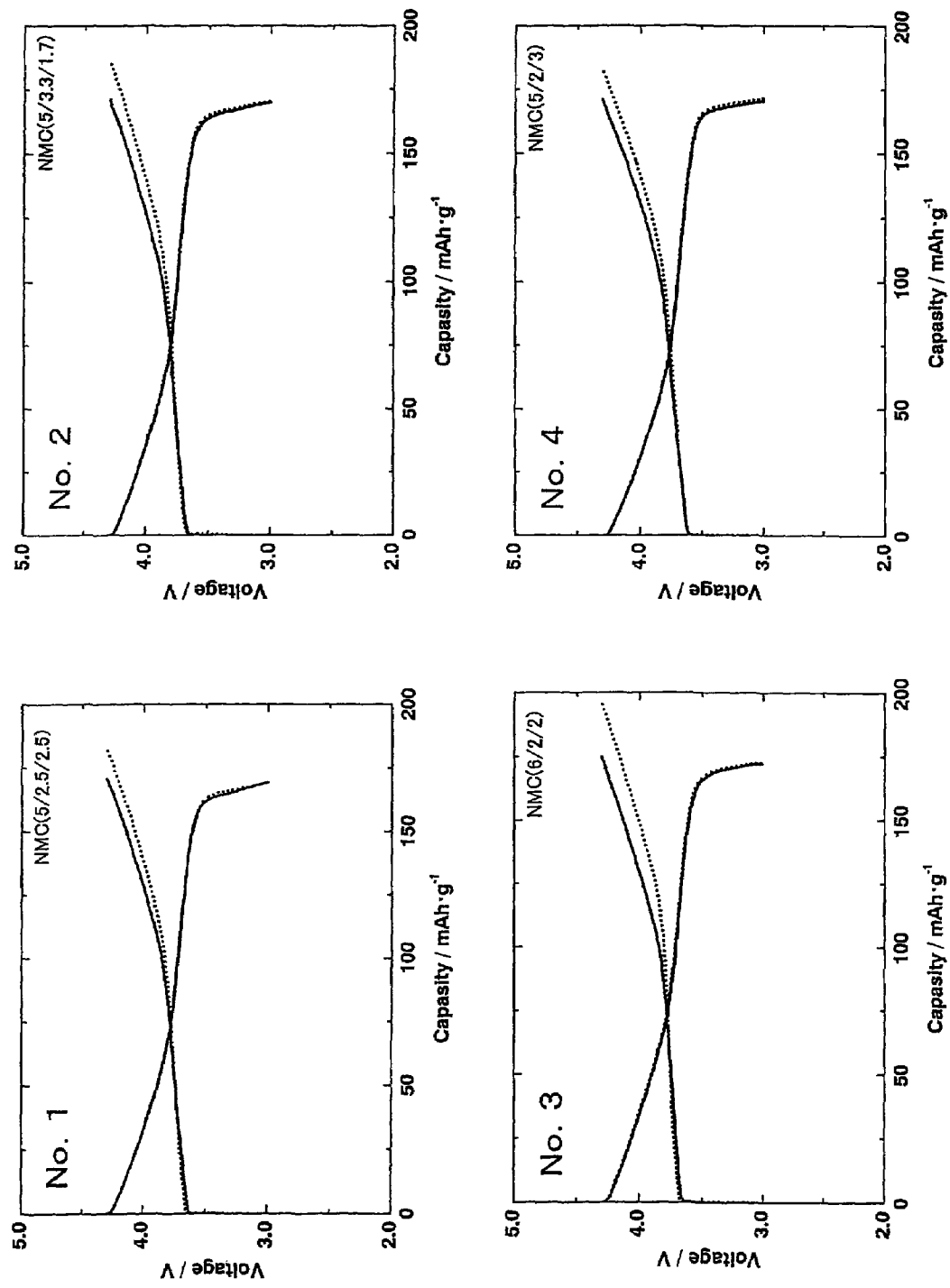
FIG. 10 shows graphs showing charge-discharge curves of cells including typical positive electrode active materials.

FIG. 10 shows the electrochemical characteristics of four samples shown in Table 3. These characteristics were measured using a coin type battery produced in the manner as described in (4) above. In all cases, the discharge capacity exceeded 170 mAh/g. From the results that no significant difference is observed in the shape of discharge curve among samples and no step appears in the curves during discharge, it is confirmed that the reaction due to a single phase with no impurity phase included proceeded. This indicates that no structural change will occur in the active material during charging and discharging, and a good cycle life can be expected.

Figure 11A:
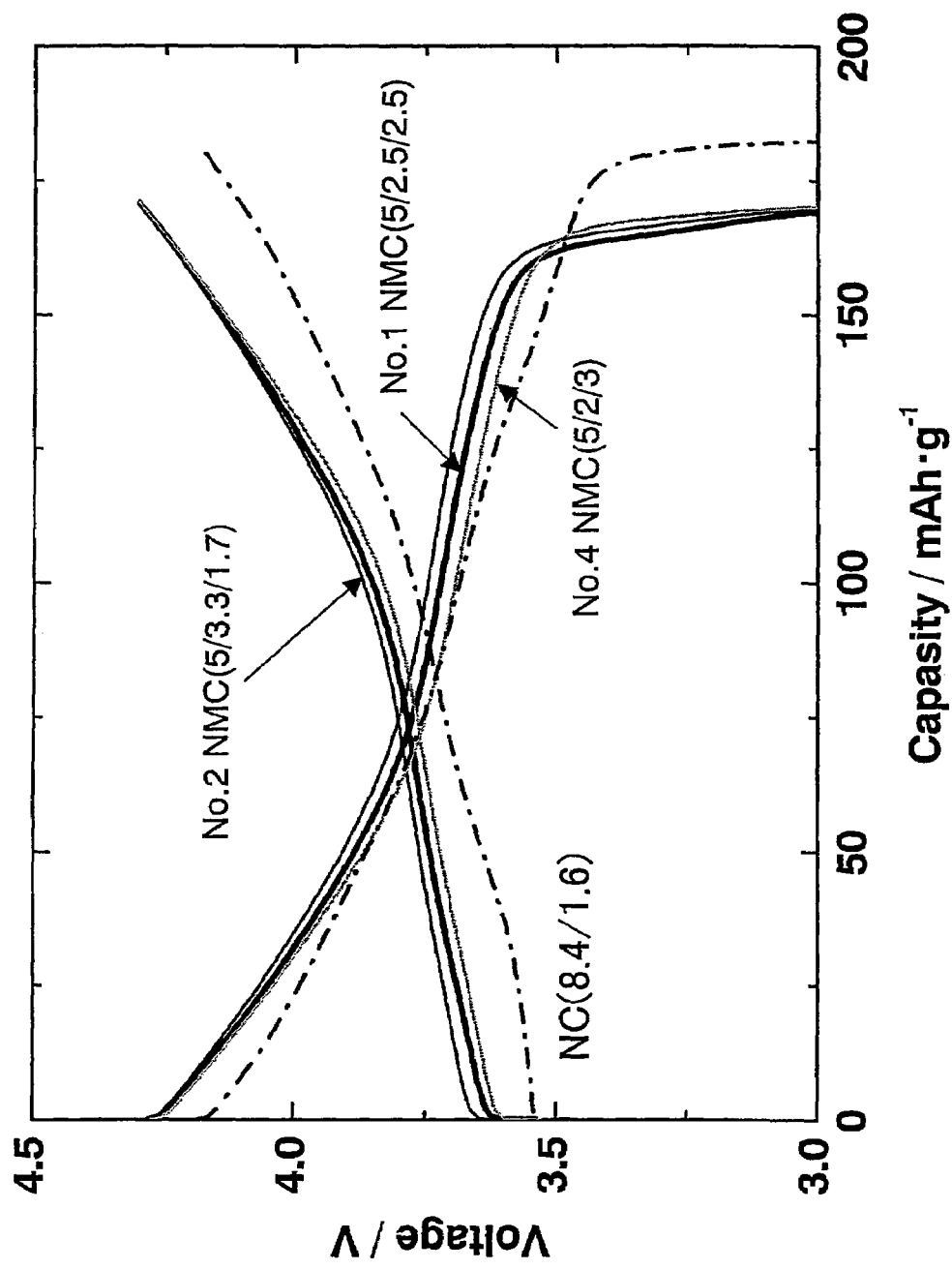
FIG. 11A shows a graph showing the correlation between a manganese content in positive electrode active materials and a charge and discharge potentials.

Detailed comparison of these data regarding the discharge voltage revealed that increasing the content of manganese caused the reversible potential to rise. FIG. 11A shows charge-discharge curves, in an overlapped manner, of batteries including three Samples of Nos. 1, 2, and 4 having the same nickel contents. The curves clearly show that when Ni/(Mn+Co)=5/5 (molar ratio), the reversible potential was declined as the content of manganese was decreased from 3.3 to 2.5 and to 2. The capacities of the three materials were almost equal. As such, the voltage can be compared simply at the middle point of discharge. The lines shown by dotted lines are a charge-discharge curve of a battery including a material (Material NC) containing nickel and cobalt only as transition metals in a molar ratio of Ni:Co=8.4:1.6. This curve shows that in the case of a material that did not include manganese, the reversible potential was significantly reduced.

As for the batteries using Samples of Nos. 1, 2, and 4, in the final stage of discharge, the voltage was maintained at higher than 3.45 V before the voltage (i.e., the potential versus lithium metal of the positive electrode active material) started dropping. In contrast, as for the battery using Material NC, the voltage dropped sharply at a point lower than 3.45 V.

Figure 11B:
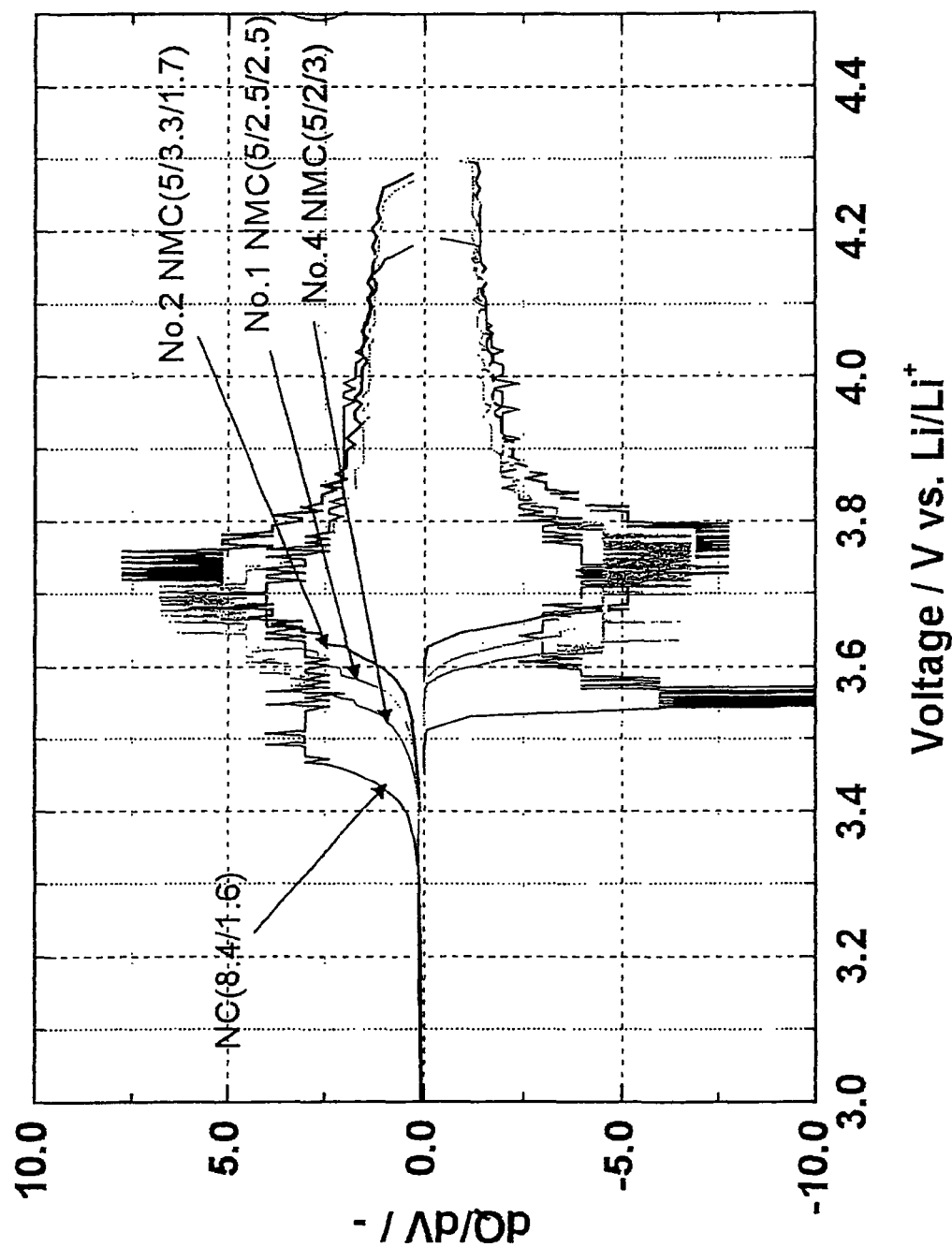
FIG. 11B shows a graph showing differential curves of the charge-discharge curves of FIG. 11A.

FIG. 11B shows differential curves of the charge-discharge curves of FIG. 11A. In FIG. 11B, as for the batteries using Samples of Nos. 1, 2, and 4, the voltage at which the differential curve shows a sharp rise exceeds 3.5 V. In contrast, as for the battery using Material NC, the differential curve shows a sharp rise when the battery voltage is lower than 3.45 V. The point at which the differential curve shows the sharpest rise corresponds to the point at which $d^3 Q/dV^3$ is maximum.

Figure 12:
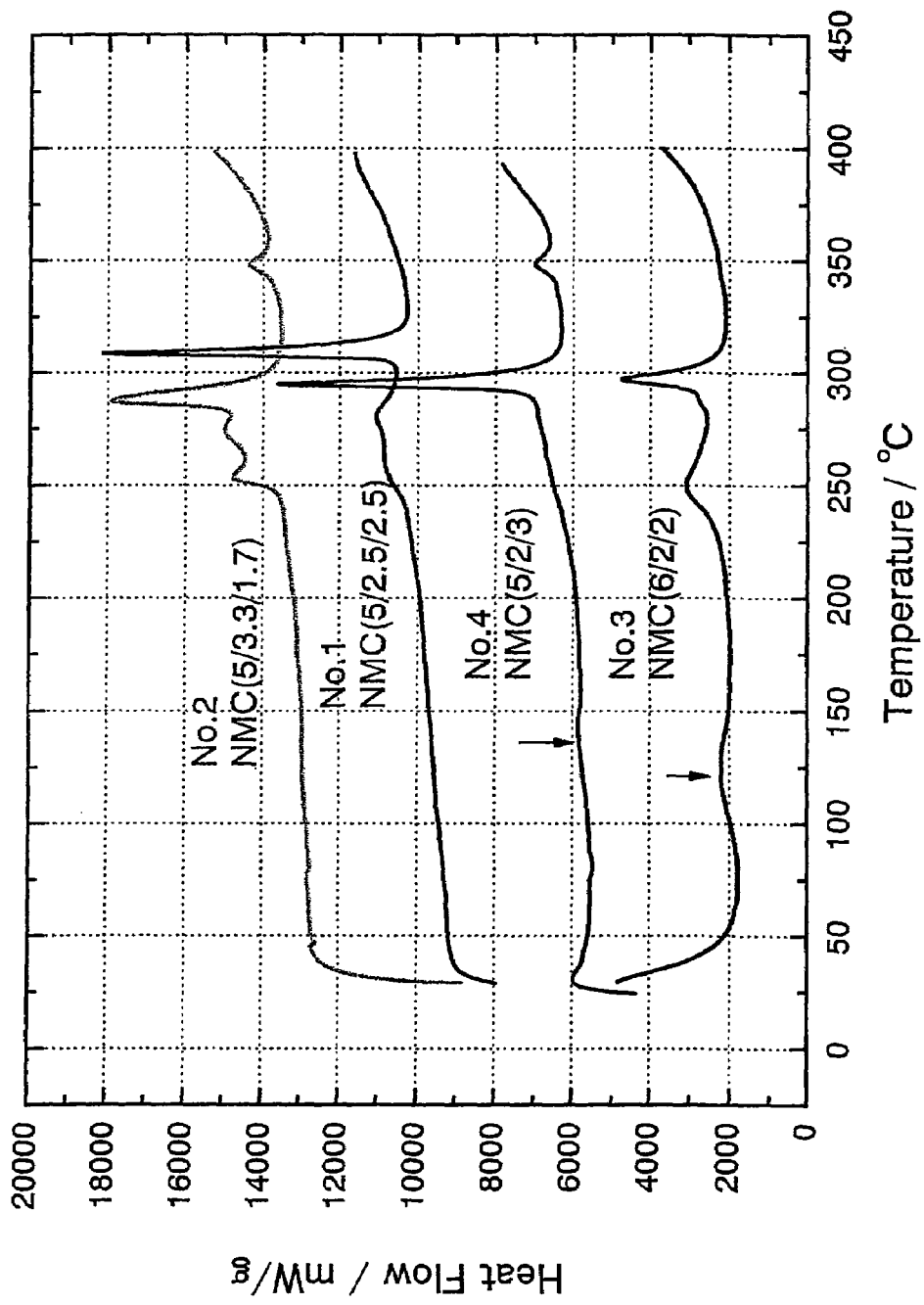
FIG. 12 shows a graph showing the correlation between a manganese content in positive electrode active materials and DSC characteristics.

FIG. 12 shows the results of DSC measurement of each sample in a charged state. The DSC measurement was performed in the same manner as described in (6) above. When attention is directed to the exothermic peak appearing in the range of 100° C. to 150° C. in FIG. 12, heat generation is observed in Samples of No. 3 and No. 4 at the point indicated by the arrow in the figure. This indicates that in order to obtain a positive electrode active material excellent in heat resistance that does not cause heat generation at low temperatures, it is more preferable that, assuming that the total number of moles of nickel, manganese, and cobalt is 10, the content of manganese is 2.5 or more.

Example 2

Figure 13:
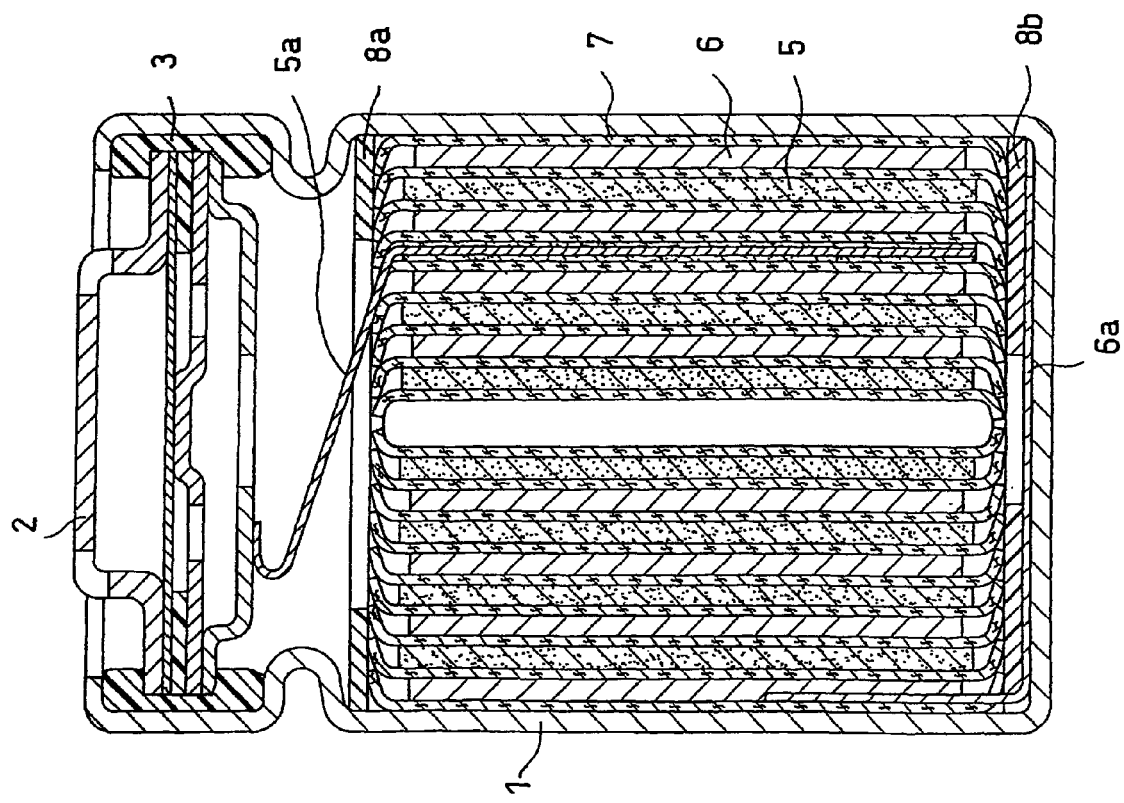
FIG. 13 shows a longitudinal cross-sectional view of a cylindrical non-aqueous electrolyte secondary battery according to Examples of the present invention.

Next, a cylindrical lithium secondary battery was produced using the positive electrode active material of the present invention. FIG. 13 shows a longitudinal cross-sectional view of the cylindrical battery produced in this Example.

The producing method of each component used for the battery is described below. It should be noted that the production methods other than that of the positive electrode active material are conventionally well-known methods.

(a) Production of Positive Electrode Plate

As the positive electrode active material, the active material of No. 2 in Example 1 was used. A paste including positive electrode material mixture was prepared by mixing 100 parts by weight of the positive electrode active material, 4 parts by weight of acetylene black serving as a conductive agent, 5 parts by weight of polyvinylidene fluoride (PVDF) serving as a binder, and N-methyl-2-pyrrolidone (NMP). The PVDF was dissolved in the NMP beforehand, so that it was used in the form of solution. This paste was applied onto both surfaces of a positive electrode current collector made of a 15-μm-thick aluminum foil, dried, then rolled, and cut into a predetermined size, whereby a 175-μm-thick positive electrode plate was obtained.

(b) Production of Negative Electrode Plate

A paste including negative electrode material mixture was obtained by mixing 98 parts by weight of massive artificial graphite powder, 82 parts by weight of aqueous solution containing 1 wt % of CMC (methyl cellulose), and 2 parts by weight of styrene-butadiene rubber serving a binder. The styrene-butadiene rubber was dispersed beforehand into the aqueous CMC solution. This paste was applied onto both surfaces of a negative electrode current collector made of a 10-μm-thick copper foil, dried, then rolled, and cut into a predetermined size, whereby a 170-μm-thick negative electrode plate was obtained.

(c) Preparation of Non-Aqueous Electrolyte

To a mixed solvent including ethylene carbonate, ethyl methyl carbonate, and dimethyl carbonate in a volume ratio of 1:1:8, 4 wt % of vinylene carbonate was added, and $LiPF_6$ was dissolved in the resultant mixture at a concentration of 1.4 mol/L, whereby a non-aqueous electrolyte was obtained.

(d) Production of Cylindrical Battery

To the current collectors of a positive electrode 5 and a negative electrode 6, a positive electrode lead 5a made of aluminum and a negative electrode lead 6a made of nickel were fixed, respectively. Thereafter, the positive electrode 5 and the negative electrode 6 were wound with a separator 7 made of polyethylene interposed therebetween, to form an electrode plate assembly. Insulating plates 8a and 8b were arranged on the upper portion and the lower portion of the electrode plate assembly, respectively. The negative electrode lead 6a was welded to a battery case 1 also serving as a negative electrode terminal. The positive electrode lead 5a was welded to a sealing plate 2 having an internal pressure sensitive type safety valve and serving as a positive electrode terminal. After the electrode plate assembly was housed in the interior of the battery case 1, the non-aqueous electrolyte was injected in the interior of the battery case 1 in a pressure reduction system. Lastly, the opening end of the battery case 1 was crimped onto the sealing plate 2 with a gasket 3 interposed therebetween, whereby a battery was completed. The size of the battery was 18 mm in diameter and 65 mm in height, and the average design capacity of battery was 2400 mAh.

(e) Evaluation of Discharge Characteristics

Charge Conditions Charge was performed under a 4.2 V constant-current (1630 mA: 0.7 C) and constant-voltage charge system in a 25° C. environment until the end-of-charge current reached 50 mA. Here, 1 C was assumed to be 2330 mA, which was the minimum design capacity.

Discharge Conditions (1): Discharge was performed at each of the temperatures of −10° C., 0° C., 25° C., and 45° C. and at a current value of 1 C, until the voltage became 3 V or less.

Discharge Conditions (2): Discharge was performed at a temperature of 25° C. and at each of the current values of 0.2 C and 2 C, until the voltage became 3 V or less.

Figure 14:
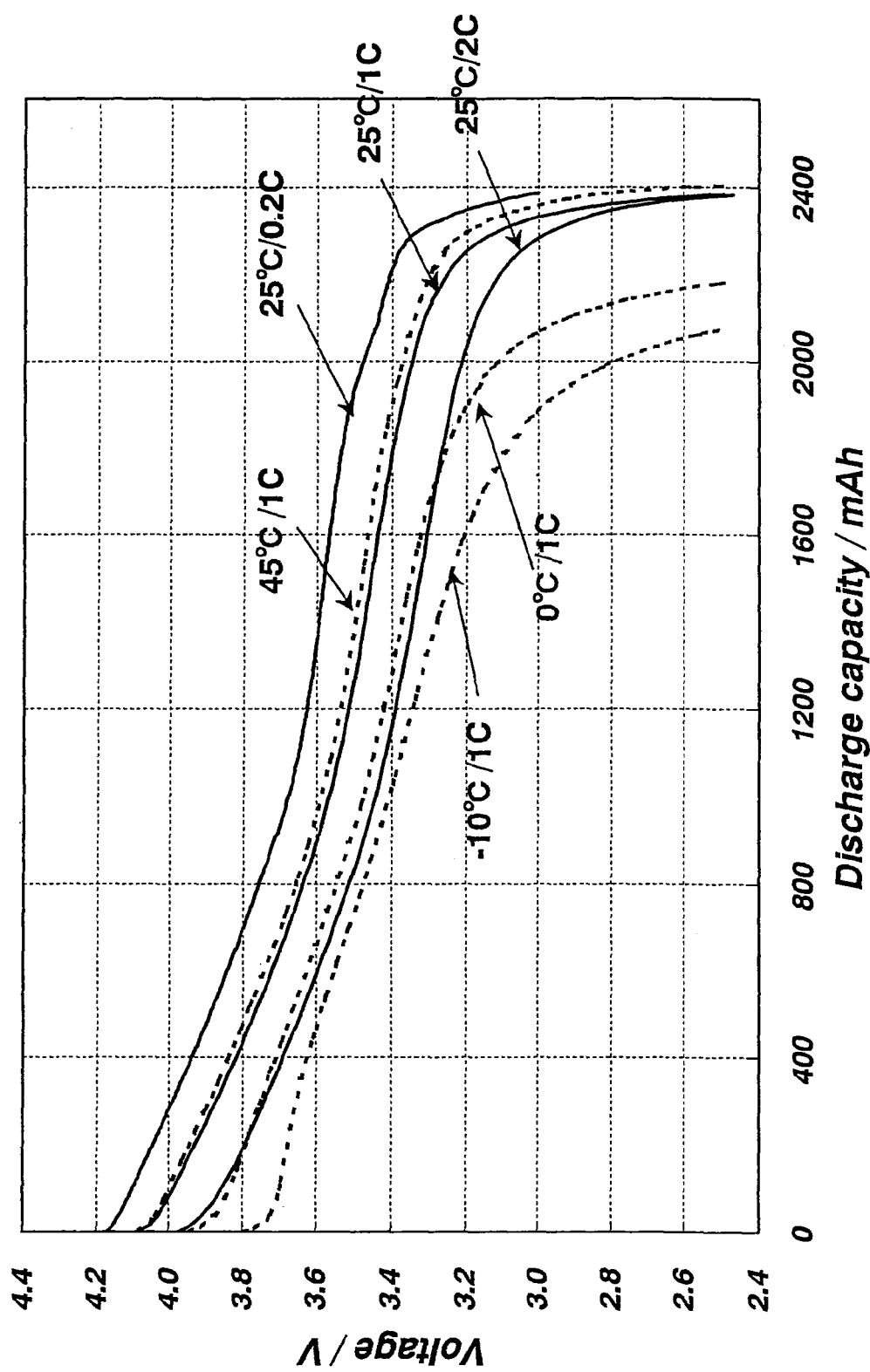
FIG. 14 shows a graph showing discharge characteristics of the cylindrical non-aqueous electrolyte secondary battery according to Examples of the present invention.

FIG. 14 shows the discharge characteristics of the cylindrical battery. From FIG. 14, it is found that the capacity due to the 0.2 C discharge was 2400 mAh, and the 98% or more discharge capacities were obtained in the high-rate discharges at 1 C and 2 C. The capacity in the 1 C discharge at −10° C. was also as high as 2000 mAh or more, indicating that good temperature characteristics can be obtained.

Example 3

In this example, the effect achieved when the surface of the active material is doped with a different element was verified. The precursor of the active material of No. 3 in Example 1 was used for the experiment. As for the doping amount, 0.01 mol (i.e., 1 mol %) of doping element was used per one mole of total transition metal elements. The other conditions were the same as those in Example 1. As the lithium raw material, lithium carbonate was used. Lithium carbonate and the precursor were mixed at such a ratio that lithium was contained in an amount exceeding 3 mol % relative to the transition metals, and baked at 935° C. for 10 hours, whereby an active material was obtained. As the doping element, aluminum, magnesium, zirconium, indium, manganese, or tin was used. In the case where the doping element was manganese, the effect achieved when manganese was present unevenly on the surface was verified.

As a method for doping with a different element, fine particles of an oxide or a hydroxide containing each element were wet-mixed together with the precursor to allow them to be dispersed, and then dried. Thereafter, the precursor containing the doping element, and lithium carbonate were mixed, and then baked.

Coin batteries were produced using lithium metal as the negative electrode in the same manner as described in (4) above, to evaluate the active material. The coin batteries were subjected to a trickle charge in which the batteries were charged at a current density of 0.33 mA/cm² in a 45° C. environment until the voltage became 4.5 V, and then allowed to stand for one week at a constant voltage of 4.5 V. The coin batteries having been subjected to the trickle charge was disassembled to quantitate the amount of transition metals deposited on the negative electrode. In such a manner, the effect of inhibiting leaching was evaluated. The results are shown in Table 4.

TABLE 4

| Ni/Mn/Co | | 6/2/2 | 6/2/2 | 6/2/2 | 6/2/2 | 6/2/2 | 6/2/2 | 6/2/2 |
|---|---|---|---|---|---|---|---|---|
| Surface coat | | none | Al (1%) | Mg (1%) | Zr (1%) | In (1%) | Mn (1%) | Sn (1%) |
| Li ratio Li/Me | | 1.03 | 1.03 | 1.03 | 1.03 | 1.03 | 1.03 | 1.03 |
| Leached | 1 | 25.1 | 16.8 | 24.0 | 14.0 | 26.0 | 21.0 | 14.0 |
| metal | 2 | 19.0 | 16.1 | 16.0 | 10.0 | 18.0 | 17.2 | 14.8 |
| [μg/g] | Av. | 22.1 | 16.5 | 20 | 12.0 | 22 | 19.1 | 14.4 |

The number of coin batteries used in the test was two in each case, and the average of the results thereof is shown in the bottom row of Table 4. In the comparative sample to which no doping element was added, the amount of leached metal was 22.1 μg/g. In the cases where elements other than indium were used as a doping element, the effect of inhibiting elusion was observed. In particular, in the cases where elements of aluminum, zirconium, and tin were used, the effect was notable. The leaching of transition metals from the positive electrode active material is one of the causes of deterioration in cycle life. Therefore, inhibiting the leaching of transition metals is considered to improve the cycle life.

Cylindrical batteries or coin batteries were used in the above-described examples, but batteries different in shape such as prismatic batteries can be used with the same effect. Further, it is considered that adding a small amount of element, such as iron, zinc, yttrium, and ytterbium, will produce effects of inhibiting side reaction on the surface of the active material, improving the heat resistance, and other effects. Furthermore, it is considered that adding magnesium, strontium, or the like will produce effects of improving the conductivity, accelerating the growth of particles, and other effects.

The positive electrode active material of the present invention has a good balance among cost, safety, capacity, and the like. By using the positive electrode active material of the present invention, it is possible to provide a high capacity non-aqueous electrolyte secondary battery excellent in load characteristics and cycle life.

The non-aqueous electrolyte secondary battery of the present invention has a high capacity and is highly reliable particularly when charged at high temperatures and high voltages, and therefore is useful as a power source for driving electronic equipment, such as notebook computers, mobile phones, and digital still cameras; and a power source for equipment that are required to have high output, such as power storage equipment and electric automobiles.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A positive electrode active material for a non-aqueous electrolyte secondary battery comprising a lithium-containing transition metal oxide having a closest-packed cubic structure of oxygen, wherein:
said lithium-containing transition metal oxide has a composition represented by the formula (1):

$\text{Li}[\text{Li}_p(\text{Ni}_x\text{Mn}_y\text{Co}_z)_{1-p}]\text{O}_2$, where x, y, and z represent element contents of nickel, manganese, and cobalt, respectively, and satisfy $0.2+y \leq x \leq 0.7$, $0.25 \leq y$, $0.05 < z$, $x+y+z=1$, and $0 \leq p \leq 0.1$, Ni, Mn and Co are evenly dispersed at atomic level in said lithium-containing transition metal oxide, and
in a triangular phase diagram showing the element contents of nickel, manganese, and cobalt in terms of molar ratio, the composition represented by said formula (1) falls within a pentagonal region defined by five vertices satisfying (x:y:z)=(6:2:2), (5:2.5:2.5), (5:3.3:1.7), (6.36: 2.73:0.091), and (6.25:2.5:1.25).

2. The positive electrode active material for a non-aqueous electrolyte secondary battery in accordance with claim 1, wherein said lithium-containing transition metal oxide includes a domain where nickel and manganese are contained in a molar ratio of 1:1 or 2:1 and a domain where nickel and cobalt are contained in a molar ratio of 1:1.

3. The positive electrode active material for a non-aqueous electrolyte secondary battery in accordance with claim 1, wherein in performing charge and discharge using said positive electrode active material formed into a sheet, at a current density of 0.33 mA/cm² or less per unit area of said sheet and 8 mA/g or less per unit weight of said positive electrode active material and at a potential ranging from 4.3 V to 3.0 V versus lithium metal potential, the difference between a charge capacity at the first cycle and a discharge capacity at the third cycle (irreversible capacity) is 20 mAh/g or less, and the reversible capacity at the third cycle is 165 mAh/g or more.

4. The positive electrode active material for a non-aqueous electrolyte secondary battery in accordance with claim 1, wherein said lithium-containing transition metal oxide includes a secondary particle having an average particle size (D50) of 11 μm or less, and said secondary particle is a sintered body of primary particles having an average particle size (D50) of 2 μm or less.

5. The positive electrode active material for a non-aqueous electrolyte secondary battery in accordance with claim 1, wherein the tap density of said lithium-containing transition metal oxide is 2.0 g/cm$^3$ or more.

6. The positive electrode active material for a non-aqueous electrolyte secondary battery in accordance with claim 1, wherein the tap density of said lithium-containing transition metal oxide is 2.2 g/cm$^3$ or more.

7. The positive electrode active material for a non-aqueous electrolyte secondary battery in accordance with claim 1, wherein the potential at which potential V sharply drops in a final stage of discharge (the potential that gives a maximum $d^3Q/dV^3$ by triple differentiation when capacity is denoted by Q) is higher than 3.45 V versus lithium metal.

8. The positive electrode active material for a non-aqueous electrolyte secondary battery in accordance with claim 1, wherein in performing a differential scanning calorimetry (DSC) at a temperature elevation rate of 10° C./min after charging up to 4.4 V as a potential versus lithium metal, no substantial exothermic peak appears at temperatures of 200° C. or lower.

9. The positive electrode active material for a non-aqueous electrolyte secondary battery in accordance with claim 4, wherein the interior or the surface of said primary particles is doped with at least one different element selected from the group consisting of aluminum, magnesium, zirconium, manganese, and tin.

10. A non-aqueous electrolyte secondary battery comprising a positive electrode including the positive electrode active material in accordance with claim 1, a negative electrode, and a non-aqueous electrolyte.

11. The non-aqueous electrolyte secondary battery in accordance with claim 10, wherein said negative electrode includes a carbonaceous material capable of absorbing and desorbing.

12. A method for producing the positive electrode active material for a non-aqueous electrolyte secondary battery in accordance with claim 1 comprising the steps of:

preparing a precursor by a coprecipitation method performed by adding dropwise an aqueous alkaline solution into an aqueous acidic solution containing nickel ion, manganese ion, and cobalt ion; and mixing said precursor and lithium carbonate and baking the resultant mixture, thereby to prepare a particle of lithium-containing transition metal oxide with nickel, manganese, and cobalt evenly dispersed at atomic level therein.

13. The method for producing the positive electrode active material for a non-aqueous electrolyte secondary battery in accordance with claim 12, wherein
the temperature in said baking is higher than 800° C.

14. The method for producing the positive electrode active material for a non-aqueous electrolyte secondary battery in accordance with claim 12, wherein
the temperature in said baking is 900° C. or higher.

15. The method for producing the positive electrode active material for a non-aqueous electrolyte secondary battery in accordance with claim 12, wherein, in the step of preparing a precursor by a coprecipitation method, manganese is prevented from being oxidized from bivalent to trivalent.

16. The method for producing the positive electrode active material for a non-aqueous electrolyte secondary battery in accordance with claim 15, wherein manganese is prevented from being oxidized from bivalent to trivalent by purging dissolved oxygen by bubbling an inert gas into the aqueous solution or adding a reducing agent into the aqueous acidic solution.

17. The positive electrode active material for a non-aqueous electrolyte secondary battery in accordance with claim 1, wherein x satisfies $0.55 \leq x \leq 0.65$.

* * * * *